US009578377B1

(12) United States Patent
Malik et al.

(10) Patent No.: US 9,578,377 B1
(45) Date of Patent: Feb. 21, 2017

(54) DISPLAYING A GRAPHICAL GAME PLAY FEED BASED ON AUTOMATICALLY DETECTING BOUNDS OF PLAYS OR DRIVES USING GAME RELATED DATA SOURCES

(71) Applicant: VenueNext, Inc., Palo Alto, CA (US)

(72) Inventors: Kunaldeep Malik, Palo Alto, CA (US); Mark Kilgore, San Francisco, CA (US)

( * ) Notice: Subject to any disclaimer, the term of this patent is extended or adjusted under 35 U.S.C. 154(b) by 0 days.

(21) Appl. No.: 14/559,605

(22) Filed: Dec. 3, 2014

Related U.S. Application Data

(60) Provisional application No. 61/911,346, filed on Dec. 3, 2013.

(51) Int. Cl.
*G06F 3/00* (2006.01)
*G06F 13/00* (2006.01)
(Continued)

(52) U.S. Cl.
CPC ......... *H04N 21/47217* (2013.01); *G11B 27/11* (2013.01); *H04N 7/17318* (2013.01);
(Continued)

(58) Field of Classification Search
None
See application file for complete search history.

(56) References Cited

U.S. PATENT DOCUMENTS 4,292,507 A * 9/1981 Hovorka ............. G06G 1/0005
235/90
5,527,033 A * 6/1996 Puma .................... A63B 71/06
273/148 R
(Continued)

OTHER PUBLICATIONS

Goodell, "Official Playing Rules and Casebook of the National Football League", 2011, Retrieved from the Internet: <http://www.nfl.com/static/content/public/image/rulebook/pdfs/2011_Rule_Book.pdf>.*

(Continued)

*Primary Examiner* — William J Kim
(74) *Attorney, Agent, or Firm* — Hickman Palermo Becker Bingham LLP

(57) ABSTRACT

Computer systems and methods in various embodiments are configured for improving speed and efficiency of server computers and remote client devices connected to the server computers, and requesting and downloading indexed and persistently stored segments of multimedia content, such as video during a sporting event, in real-time and/or with minimal delay from the server computers. In an embodiment, a computer system comprises a memory; a processor coupled to the memory; play event transceiver logic coupled to the memory and the processor and configured to electronically receive a first set of digital data associated with the sporting event; play event processing logic coupled to the memory and the processor and configured to determine that a first play has ended based on the first set of digital data, and in response, to generate a first play event signal; wherein the play event transceiver logic is further configured to send the first play event signal to the one or more mobile computing devices; a data storage device configured to store mobile device app logic comprising one or more sequences of instructions which when downloaded to and executed using the one or more mobile computing devices causes each of the one or more mobile computing devices, in response to receiving the first play event signal, to display a first graphical tile in a graphical tile list in a graphical user interface on a display coupled to that mobile computing device.

18 Claims, 15 Drawing Sheets

(51) Int. Cl.
*H04N 5/445* (2011.01)
*H04N 7/173* (2011.01)
*H04N 21/472* (2011.01)
*H04N 21/2187* (2011.01)
*H04N 21/431* (2011.01)
*H04N 21/81* (2011.01)
*G11B 27/11* (2006.01)
*H04N 21/2387* (2011.01)
*H04N 21/6587* (2011.01)

(52) U.S. Cl.
CPC ..... *H04N 21/2187* (2013.01); *H04N 21/2387* (2013.01); *H04N 21/4312* (2013.01); *H04N 21/6587* (2013.01); *H04N 21/8133* (2013.01)

(56) References Cited

U.S. PATENT DOCUMENTS

| | | |
|---|---|---|
| 5,557,717 A | 9/1996 | Wayner |
| 5,636,920 A | 6/1997 | Shur et al. |
| 6,144,375 A | 11/2000 | Jain et al. |
| 6,452,609 B1 | 9/2002 | Katinsky et al. |
| 6,545,689 B1 | 4/2003 | Tunli |
| 6,631,522 B1* | 10/2003 | Erdelyi ............. G06F 17/30793 |
| | | 348/E7.061 |
| 6,681,398 B1* | 1/2004 | Verna ....................... H04N 5/76 |
| | | 348/E5.103 |
| 6,795,638 B1 | 9/2004 | Skelley |
| 6,977,667 B1 | 12/2005 | Burke |
| 7,110,955 B1 | 9/2006 | Barhnart et al. |
| 7,791,607 B1 | 9/2010 | Hughes et al. |
| 8,214,741 B2 | 7/2012 | Errico et al. |
| 8,358,345 B1 | 1/2013 | Fiore et al. |
| 8,612,534 B1 | 12/2013 | Hossack |
| 8,634,708 B2 | 1/2014 | Chevallier et al. |
| 9,032,296 B1 | 5/2015 | Jeffs |
| 2002/0012526 A1 | 1/2002 | Sai et al. |
| 2002/0040253 A1 | 4/2002 | Mcnally et al. |
| 2002/0040482 A1* | 4/2002 | Sextro ................. H04N 5/44543 |
| | | 725/136 |
| 2002/0191952 A1 | 12/2002 | Fiore et al. |
| 2003/0001880 A1 | 1/2003 | Holtz et al. |
| 2003/0063125 A1 | 4/2003 | Miyajima et al. |
| 2003/0074373 A1 | 4/2003 | Kaburagi et al. |
| 2003/0090504 A1 | 5/2003 | Brook et al. |
| 2003/0137531 A1 | 7/2003 | Katinsky et al. |
| 2004/0008225 A1 | 1/2004 | Campbell |
| 2004/0056879 A1 | 3/2004 | Erdelyi |
| 2004/0070594 A1 | 4/2004 | Burke |
| 2004/0095377 A1 | 5/2004 | Salandro |
| 2004/0226012 A1 | 11/2004 | Awada et al. |
| 2005/0005308 A1 | 1/2005 | Logan |
| 2005/0204294 A1 | 9/2005 | Burke |
| 2005/0210410 A1 | 9/2005 | Ohwa et al. |
| 2006/0170760 A1* | 8/2006 | Anderson ........... H04N 7/17318 |
| | | 348/14.04 |
| 2006/0277460 A1 | 12/2006 | Forstall et al. |
| 2006/0277481 A1 | 12/2006 | Forstall et al. |
| 2007/0118608 A1* | 5/2007 | Egli ..................... G06F 17/3089 |
| | | 709/217 |
| 2007/0168543 A1 | 7/2007 | Krikorian et al. |
| 2007/0186183 A1 | 8/2007 | Hudson |
| 2007/0209018 A1 | 9/2007 | Lindemann |
| 2007/0245238 A1 | 10/2007 | Fugitt |
| 2007/0300157 A1 | 12/2007 | Clausi et al. |
| 2008/0060001 A1 | 3/2008 | Logan et al. |
| 2008/0066011 A1 | 3/2008 | Urrabazo et al. |
| 2008/0066111 A1 | 3/2008 | Ellis et al. |
| 2008/0082922 A1 | 4/2008 | Biniak et al. |
| 2008/0086688 A1 | 4/2008 | Chandratillake et al. |
| 2008/0086755 A1 | 4/2008 | Darnell et al. |
| 2008/0172615 A1 | 7/2008 | Igelman et al. |
| 2008/0238615 A1 | 10/2008 | Carpenter |
| 2008/0244453 A1 | 10/2008 | Cafer |
| 2008/0244456 A1 | 10/2008 | Shimizu |
| 2008/0305870 A1 | 12/2008 | Henderson |
| 2009/0070407 A1 | 3/2009 | Castle et al. |
| 2009/0124193 A1* | 5/2009 | Mitzel ..................... H04H 20/33 |
| | | 455/3.01 |
| 2009/0132924 A1* | 5/2009 | Vasa ..................... G11B 27/105 |
| | | 715/723 |
| 2009/0143007 A1 | 6/2009 | Terlizzi |
| 2009/0158192 A1 | 6/2009 | De Peuter |
| 2009/0164569 A1* | 6/2009 | Garcia ................. H04L 12/1859 |
| | | 709/203 |
| 2009/0164902 A1 | 6/2009 | Cohen et al. |
| 2009/0164904 A1 | 6/2009 | Horowitz et al. |
| 2009/0288009 A1 | 11/2009 | Dulaney |
| 2010/0005399 A1 | 1/2010 | Friedman et al. |
| 2010/0035682 A1 | 2/2010 | Gentile et al. |
| 2010/0050198 A1 | 2/2010 | Mockry et al. |
| 2010/0077355 A1 | 3/2010 | Belinsky et al. |
| 2010/0278509 A1 | 11/2010 | Nagano |
| 2010/0287473 A1 | 11/2010 | Recesso et al. |
| 2010/0287592 A1 | 11/2010 | Patten et al. |
| 2010/0299183 A1 | 11/2010 | Fujioka |
| 2011/0013087 A1 | 1/2011 | House et al. |
| 2011/0040760 A1* | 2/2011 | Fleischman ............. G06Q 30/02 |
| | | 707/737 |
| 2011/0066943 A1 | 3/2011 | Brillon et al. |
| 2011/0090402 A1 | 4/2011 | Huntington et al. |
| 2011/0113348 A1 | 5/2011 | Twiss et al. |
| 2011/0154200 A1 | 6/2011 | Davis et al. |
| 2011/0169959 A1 | 7/2011 | DeAngelis et al. |
| 2011/0173214 A1 | 7/2011 | Karim |
| 2011/0246889 A1 | 10/2011 | Moore |
| 2011/0291945 A1 | 12/2011 | Ewing et al. |
| 2011/0316884 A1 | 12/2011 | Glambalvo et al. |
| 2012/0078667 A1 | 3/2012 | Denker et al. |
| 2012/0130741 A1 | 5/2012 | Sparandara et al. |
| 2012/0131507 A1 | 5/2012 | Sparandara et al. |
| 2012/0166955 A1 | 6/2012 | Bender |
| 2012/0166964 A1 | 6/2012 | Tseng |
| 2012/0179969 A1 | 7/2012 | Lee et al. |
| 2012/0189273 A1 | 7/2012 | Folgner et al. |
| 2012/0192121 A1 | 7/2012 | Bonnat |
| 2012/0192227 A1* | 7/2012 | Fleischman ........ H04N 21/2407 |
| | | 725/34 |
| 2012/0246567 A1 | 9/2012 | Brahms et al. |
| 2012/0260211 A1 | 10/2012 | Sathish et al. |
| 2012/0311447 A1 | 12/2012 | Chisa et al. |
| 2012/0324357 A1 | 12/2012 | Viegers et al. |
| 2013/0036369 A1 | 2/2013 | Mitchell et al. |
| 2013/0047085 A1 | 2/2013 | Roberts et al. |
| 2013/0055128 A1 | 2/2013 | Muti et al. |
| 2013/0080968 A1 | 3/2013 | Hanson et al. |
| 2013/0086501 A1 | 4/2013 | Chow et al. |
| 2013/0095909 A1 | 4/2013 | O'Dea |
| 2013/0132836 A1 | 5/2013 | Ortiz |
| 2013/0157735 A1 | 6/2013 | Amaitis et al. |
| 2013/0178284 A1 | 7/2013 | Hughes et al. |
| 2013/0191752 A1 | 7/2013 | Lapierre et al. |
| 2013/0227596 A1 | 8/2013 | Pettis et al. |
| 2013/0275151 A1 | 10/2013 | Moore et al. |
| 2013/0321388 A1* | 12/2013 | Locke ................. G06F 17/30867 |
| | | 345/418 |
| 2013/0324245 A1* | 12/2013 | Harvey ..................... A63F 13/00 |
| | | 463/31 |
| 2014/0046802 A1 | 2/2014 | Hosein |
| 2014/0059491 A1 | 2/2014 | Kim |
| 2014/0081903 A1 | 3/2014 | Koosel |
| 2014/0082506 A1 | 3/2014 | Maxwell et al. |
| 2014/0129559 A1* | 5/2014 | Estes ................... G06F 17/30424 |
| | | 707/737 |
| 2014/0195918 A1 | 7/2014 | Friedlander |
| 2014/0213357 A1 | 7/2014 | Claffey |
| 2014/0214983 A1 | 7/2014 | Hossack |
| 2014/0253431 A1 | 9/2014 | Gossweiler et al. |
| 2014/0258859 A1 | 9/2014 | Plumb |
| 2014/0282745 A1 | 9/2014 | Chipman et al. |
| 2014/0337763 A1 | 11/2014 | Feldstein et al. |

(56) References Cited

U.S. PATENT DOCUMENTS

2014/0364974 A1* 12/2014 Wohl ................. G06K 7/10227
　　　　　　　　　　　　　　　　　　　　　　　　700/91
2015/0058730 A1　2/2015 Dubin
2015/0058780 A1　2/2015 Malik
2015/0058781 A1　2/2015 Malik et al.
2015/0248917 A1　9/2015 Chang

OTHER PUBLICATIONS

Nessman, "ESPN Gamecast a Sweet Way to Keep Up With a Game", dated Jan. 23, 2012, http://kfmx.com/espn-gamecast-a-sweet-way-to-keep-up-with-a-game/, 1 page.

* cited by examiner

DISPLAYING A GRAPHICAL GAME PLAY FEED BASED ON AUTOMATICALLY DETECTING BOUNDS OF PLAYS OR DRIVES USING GAME RELATED DATA SOURCES

BENEFIT CLAIM

This application claims the benefit under 35 U.S.C. §119 (e) of provisional application 61/911,346, filed Dec. 3, 2013, the entire contents of which are hereby incorporated by reference for all purposes as if fully set forth herein.

TECHNICAL FIELD

The present disclosure relates to techniques for indexing segments of multimedia content from one or more sources. The disclosure relates more specifically to improving speed and efficiency of server computers and remote client devices connected to the server computers, by indexing persistently stored segments of multimedia based on boundaries dynamically derived from one or more feeds.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Certain games, or sporting events, are comprised of plays. A play may be a series of movements by at least one player, frequently in concert with a team of players, to score points, achieve a goal, or advance the position of a team, ball, puck, or other object(s). Examples include plays in the American game of football. Frequently, another player, or team of players, acts in opposition to prevent advancement.

Fans frequently review game plays for the purpose of experiencing the play again, viewing details of the play, or analysis of the play or the game. For example, fans will review one or more plays in which a score was made. Accordingly, plays may be made available to fans to review. One method of presenting reviewable plays is to post links to a handful of key plays on a website. However, merely linking to plays may be overwhelming and difficult for a fan to find a particular play that the fan wants to review. In addition, many sources of game data do not include any information that specifically indicates the beginning or end of a particular play, and consequently a data processing system may receive no information that can be used to separate game data displays into discrete plays. Therefore, there is a need for improved techniques of displaying information about game plays.

SUMMARY OF THE INVENTION

The appended claims may serve as a summary of the invention.

Figure 1A:
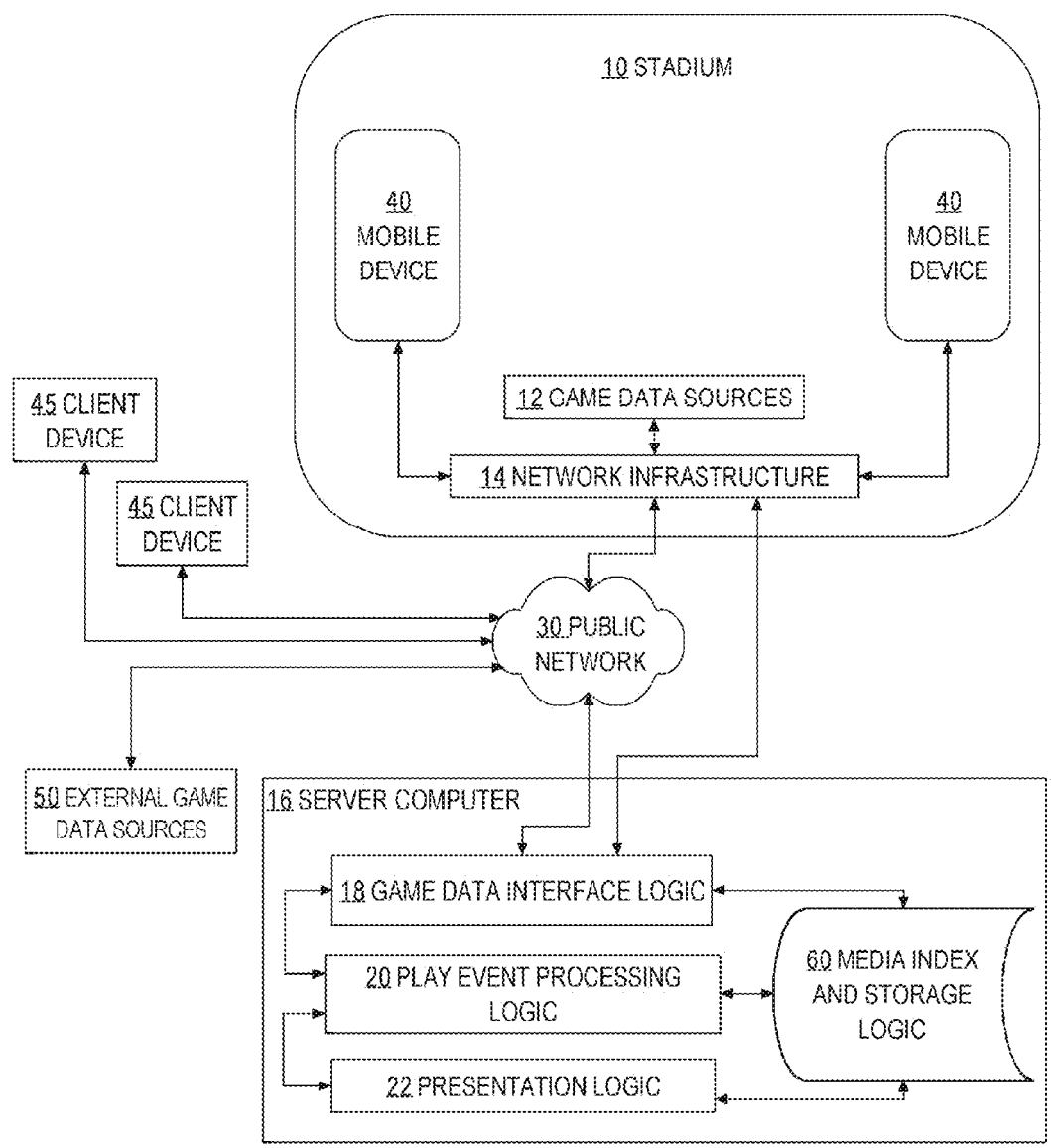
FIG. 1A illustrates an example networked computer system configured to process game play data and provide display data useful in mobile computing devices.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments. For example, play event processing logic 20 in FIG. 1A may be described with reference to several components illustrated in FIG. 1B, FIG. 1C, and/or any other figure and discussed in detail below, but using the particular arrangement illustrated in FIG. 1A is not required in other embodiments.

DETAILED DESCRIPTION

Techniques for displaying a scrollable graphical game play feed associated with a sporting event are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Network Topology
3.0 Play Events
4.0 Process Overview
 4.1 Receiving Game Data from one or more Sources
 4.2 Generating a Play Event
 4.3 Determining when a Play Begins and/or Ends
 4.4 Determining when a Drive Begins and/or Ends
 4.5 Creating indexes into Multimedia Content based on Data in a Play Event
 4.6 Updating an Interface on one or more Remote Devices
 4.7 Distributing Play Events and/or Play/Drive State Data
 4.8 Displaying Content based on Play Events Received from the Server Computer
 4.9 Updating Play Event Icons and Generating Markers
 4.10 Filtering Graphical Tiles
5.0 Example Graphical User Interface with Scrollable Graphical Tiles
 5.1 Graphical Tiles
 5.2 Super Graphical Tiles and Nested Graphical Tiles
 5.3 Play Event Icons
 5.4 Markers
 5.5 Frames and Indicators
 5.6 Drive Chart
 5.7 Application
6.0 Implementation Mechanisms—Hardware Overview
7.0 Extensions and Alternatives 1.0 General Overview Displaying a scrollable graphical game play feed associated with a sporting event is described, using techniques for automatically determining the bounds of plays from a source of game data that does not explicitly delineate plays. In an embodiment, a system comprises a memory; a processor coupled to the memory; play event transceiver logic coupled to the memory and the processor and configured to electronically receive a first set of digital data associated with the sporting event; play event processing logic coupled to the memory and the processor and configured to determine that a first play has ended based on the first set of digital data, and in response, to generate a first play event signal; wherein the play event transceiver logic is further configured to send the first play event signal to the one or more mobile computing devices; a data storage device configured to store mobile device app logic comprising one or more sequences of instructions which when downloaded to and executed using the one or more mobile computing devices causes each of the one or more mobile computing devices, in response to receiving the first play event signal, to display a first graphical tile in a graphical tile list in a graphical user interface on a display coupled to that mobile computing device.

In an embodiment, the play event processing logic is configured to determine a starting time for the first play, wherein the starting time corresponds to a first segment of multimedia content stored in non-volatile storage; determine an ending time for the first play, wherein the ending time corresponds to a second segment of multimedia content stored in non-volatile storage; include the starting time and the ending time in the first play event signal; wherein the mobile device app logic is further configured to cause the mobile computing device, in response to a user selecting the first graphical tile, and based on the first play event signal, to request a plurality of segments of multimedia content, starting from the first segment of multimedia content through the second segment of multimedia content from the non-volatile storage.

In an embodiment, the play event processing logic is configured to determine a drive identifier and include the drive identifier in the first play event signal, wherein the drive identifier uniquely identifies an offensive drive of a team engaged in an American football game; determine a second play has started and receive a second set of data associated with the sporting event; determine the second play has ended from the second set of data, and in response, generate a second play event signal, which includes the drive identifier; send the second play event signal to the one or more mobile computing devices; wherein the mobile device app logic is further configured to cause each mobile computing device, in response to receiving the second play event signal, to determine that the first play event signal and the second play event signal correspond to plays that are both in the drive based on the drive identifier in the first play event signal and the second play event signal, and in response, present a second graphical tile in the graphical tile list in the graphical user interface on the display coupled to the mobile computing device and visually indicate in the graphical user interface that the first graphical tile and the second graphical tile are both part of the drive.

In an embodiment, a data processing method comprises: receiving data associated with a sporting event from one or more sources; determining that a first play has ended based on the data received from the one or more sources; in response to determining that the first play ends, generating a first play event signal; sending the first play event signal to a mobile computing device; causing displaying a first graphical tile in a graphical tile list in a graphical user interface of the mobile computing device.

Embodiments discussed herein provide numerous benefits and improvements over the general idea of watching replays. For example, one or more of the embodiments discussed herein may allow users to select and download indexed segments of multimedia content, such as video of one or more particular plays, defined as plays or drives without downloading segments belonging to other portions of the game. One or more of the embodiments discussed herein may allow a server computer to determine whether when a play begins and ends, and sending data indicating a play to a client computer, and when a play and/or drive may be retrieved from a remote persistent storage.

2.0 Network Topology

FIG. 1A illustrates an example networked computer system configured to process game play data and provide display data useful in mobile computing devices. In an embodiment, a stadium 10 comprises a site at which a sporting event or game is played. Stadium 10 broadly represents any form of arena, field, ground or grounds, park, or other place at which a sporting event may be played or undertaken. Typically stadium 10 comprises a playing field, pitch, track or other game play facility, seating for public attendees, and fixed or mobile facilities for technical personnel who are involved in producing a broadcast, telecast, or other recording of the sporting event. Various embodiments may include stadiums of any size and this disclosure specifically contemplates the use of stadiums with seating for any of a few hundred to in excess of 50,000 attendees or fans.

One or more game data sources 12 are positioned within or near the stadium and are configured to obtain or record data about game play. Examples of game data sources include television or video cameras, sound recording equipment, computers associated with statisticians or game coverage personnel, and support infrastructure for any of the foregoing. In some embodiments, game data sources 12 may be located away from the stadium; for example, in an embodiment a computer that generates data about game play may be located with an observer who is distant from the stadium and observes one or more live or delayed video images of the game that are captured by cameras that are in the stadium. Output of game data sources 12 may include digital or analog audiovisual feeds representing television or video of the game, pure digital data or structured data comprising metadata for the game or play events, transcripts, commentary, direction and/or angles at which each camera is positioned and/or pointed, zoom level of each camera, and/or other data representing the game and/or play events.

Game data sources 12 are communicatively coupled to network infrastructure 14 in stadium 10. Network infrastructure 14 may comprise wired network interfaces, wireless access points, routers, switches, access servers, authentication servers, cabling, and related networking or internetworking equipment or gear.

External game data sources 50 are communicatively coupled to game data interface logic 18 through one or more remote computer networks. One or more external game data sources 50 are configured to obtain, record, and/or send data about game play. Examples of game data sent from external game data sources 50 include data streams from league(s), media firm(s), organization(s), and/or person(s) that distribute data related to a game being played in stadium 10. Data sent from external game data sources 50 describing a particular event or segment may be sent in real time, within milliseconds or seconds after the particular event or segment occurred. Additionally or alternatively, at least some of the data sent from external game data sources 50 need not be real time. For example, data related to clock data, such as a game clock, play clock, shot clock, local time, and/or global time is sent in real time from external game data sources. Other data, such as descriptions, multimedia, and/or data that requires human data entry need not be sent in real time. In some embodiments, external game data sources 50 may include a computer at a stadium that is running a Game Statistics and Information System ("GSIS") application commercially available a sports league or organization, which may provide game clock and game state data such as score, down, distance, yard line, quarter, possession, etc. In an embodiment, the GSIS computer is coupled to a scoreboard game clock feed from a scoreboard controller of the stadium, and the scoreboard controller is operated by an official score keeper or time keeper at the stadium.

One or more methods and/or examples discussed herein may be described using particular rules, such as professional American football rules. However, the methods and/or examples discussed herein may apply to other rules. For example, one or more methods and/or examples may be applicable to Canadian football, Australian football, rugby, soccer, volleyball, basketball, and/or any other rules.

In an embodiment, data from external game data sources 50 may include a home team identifier, a visiting team identifier, a clock time describing the amount of time left and/or time played, the source of the clock (such as a stadium, tester, and/or league), whether a play is being reviewed, whether a timeout has been called, whether a referee is reviewing a penalty or other call, a play clock (such as how much time a team has to begin playing before incurring a penalty, how long a play has lasted, and/or how much time a team has to attempt to score according to some rule of the game) a number of points scored by a home team, a number of points scored by a visiting team, an indicator as to which team has possession of a ball, puck or other object, the particular period the game is in, how many downs a team currently in possession of the ball has, the distance a team has progressed, the distance remaining for a team to progress to score one or more points. Data from external game data sources 50 may include any other data discussed herein. A period may mean a half, a quarter, an overtime period, or any other length of time related to a game.

Data sent from external game data sources 50 may be in any format, such as XML, HTML, proprietary byte-packed data stream, multi-byte packet format, and/or any other standard or proprietary format. For example, in an embodiment the data may comprise a packet that encodes a home club code, clock time, visiting club code, home score, visitor score, home team possession indicator, game phase value, down value, yards-to-go value, yard line value, clock source value, play review indicator, and play clock value.

In an embodiment, network infrastructure is coupled to one or more public networks 30 which may comprise any of a LAN, WAN, internetworks, or internets. In an embodiment, a server computer 16 is coupled to the network 30; additionally or alternatively, the server computer may have a direct connection to the network infrastructure, for example, when the server computer is co-located with the stadium 10 or located nearby.

A plurality of mobile devices 40 are coupled to network infrastructure 14 and are located within stadium 10. In various embodiments, mobile devices 40 may comprise any of smartphones, tablet computers, personal digital assistants, netbook computers, ultrabook computers, laptop computers or other mobile devices. In an embodiment, the mobile devices 40 are associated with attendees of stadium 10 and there may be thousands of mobile devices having concurrently active connections to the network infrastructure 14. Connections may be wired, or may be wireless via wireless access points that are located throughout stadium 10 in positions adjacent to seats in the stadium or in other locations capable of establishing and maintaining multiple concurrent connections to the mobile devices 40. Mobile devices 40 are may download mobile device app logic that comprises one or more instructions which when downloaded and/or executed on the mobile device causes the mobile device to perform one or more of the operations, and/or implement one or more of the user interfaces, discussed herein.

Client devices 45 may comprise the same devices as discussed with mobile devices 40. Additionally or alternatively, client devices 45 may comprise personal desktop computers, portable computers, and/or any other computing devices used by one or more fans or users tracking the progress of a game played in stadium 10. In an embodiment, one or more of the user interfaces, operations, and/or one or more of the methods discussed herein that are performed or available on mobile devices 40 may be performed and/or available on client devices 45, and thus, for brevity, any reference to mobile devices 40 may include client devices 45, unless specifically indicated otherwise. In an embodiment, one or more of the user interfaces and/or one or more of the methods discussed herein are not performed and/or available on client devices 45, but may be performed and/or available on mobile devices 40. In an embodiment, one or more of the user interfaces and/or one or more of the methods discussed herein may be performed and/or available on some client devices 45, but not all client devices 45. For example, one or more of the user interfaces and/or one or more of the methods discussed herein may be performed and/or available on client devices 45 that are operated by users with an active subscription.

Server computer 16 in FIG. 1A broadly represents one or more physical computers, clusters, or processors in cloud service providers or data centers. In various embodiments, any number of such computers may be used and communicatively coupled over one or more networks. In an embodiment, server computer 16 comprises game data interface logic 18, play event processing logic 20, presentation logic 22, and media index and storage logic 60. In an embodiment, game data interface logic 18 and/or presentation logic 22 may be referred to herein as play event transceiver logic. Collectively these elements provide improved processing logic that is configured to deliver the improvements and benefits in game data receiving, processing, determination and presentation that are more fully described herein. In an embodiment, game data interface logic 18 is configured to request and/or receive game play data from game data sources 12 and/or external game data sources 50 and to format, transform, or otherwise process the game play data for use in other functional logics. For example, game data interface logic can perform buffering, classification and categorization functions. Game data interface logic 18 may receive game play data based on a regular time interval (for example, every second). Additionally or alternatively, game play data interface logic 18 may receive game play data as data is entered and/or recorded, which need not be based on a regular interval. Additionally or alternatively, game play data interface logic 18 may continuously receive game play data through one or more data streams from game data sources 12, external game data sources 50, and/or any other game data source.

In an embodiment, the play event processing logic 20 is configured to perform filtering, selection, association and other functions in the manner described further herein in connection with the process diagrams. Play event processing logic 20 may automatically determine and/or indicate whether a play has started, is in progress, and/or has ended. Additionally or alternatively, play event processing logic 20 may indicate whether a drive has started, is in progress, and/or has ended. Play event processing logic 20 may be a state machine. Other modules and/or devices, such as presentation logic 22, media index and storage logic 60, and/or mobile devices 40 may poll play event processing logic 20 to determine the current state of a game. Additionally or alternatively, play event processing logic 20 may send one or more messages to one or more modules and/or devices, such as presentation logic 22, media index and storage logic 60, and/or mobile devices 40, with an update when the state of the game changes and/or game data is received and/or processed.

In an embodiment, the presentation logic 22 is configured to generate data that can drive displays of external computing devices such as smartphones, tablet computers, other mobile devices, personal computers, web browsers, and other systems. For example, the presentation logic may implement an HTTP server and/or one or more mobile device server-side applications that can interoperate with compatible client-side applications or "apps" on the mobile computing devices 40 to provide data that the apps are capable of rendering in a graphical user interface on the mobile computing devices. Specific example embodiments of screen displays for a mobile computing device user interface are described further herein.

In an embodiment, media index and storage logic 60 may store and/or send media regarding a game played in stadium 10. Media index and storage logic 60 may store media content, such as video, audio, and/or other descriptions received from game data sources 12, external game data sources 50, and/or any other recorded content related to, discussing, and/or analyzing a game, a portion of a game, and/or an aspect of a game played in stadium 10. Media index and storage logic 60 may re-encode received content, such as video and/or audio, into one or more formats, which mobile devices 40 may randomly access. Additionally or alternatively, media index and storage logic 60 may divide video and/or audio data into one or more files that may be individually downloaded by mobile devices 40. Media index and storage logic 60 may store indexes into stored content. For example, media index and storage logic 60 may store indexes, such as timestamps that indicate when in recorded video and/or audio a play, drive, and/or other event begins and/or ends. Additionally or alternatively, indexes in media index and storage logic 60 may be pointers that point to locations and/or offsets in memory where a play, drive, and/or other event begins and/or ends.

3.0 Play Events

In an embodiment, a play event may include a description of one or more plays. A play event may include one or more identifiers that identify each play in the one or more plays in described in the play event. Additionally or alternatively, a play event may include, and/or reference, a recorded segment of a game. For example, a play event may include a play in a sporting event recorded by one or more devices and stored on one or more non-transitory storage media. "Recorded," in this sense, includes obtaining pictures, sound, or data, or a combination, relating to a segment of a game as the game is played, and also includes replaying previously recorded pictures, sound and/or data for a segment of a game that was played in the past. Thus, a segment of a game may be transiently recorded as it occurs, or replayed from stored audiovisual data. Additionally or alternatively, a play event may include, or reference, a series of plays in a sporting event.

A play event may include a drive identifier that identifies a particular drive that the one or more plays belong to. Additionally or alternatively, a drive may be determined by analyzing text, such as the description, in one or more play events. For example, if a play event description indicates a team receives possession of the ball, the play event may indicate the beginning of a drive. Similarly, if a play event description indicates the team scores, the play event may indicate the end of a drive. A drive may correspond to a play event, which comprises a set of play events. Additionally or alternatively, a drive may correspond to a different data structure that includes or references the set of play events. Additionally or alternatively, the series of plays may be recorded segments of a game stitched together from disjoint time periods, from various points of view, and/or highlighting one or more players or teams. For example, a play event may include, or reference, a series of video clips stitched together of a team receiving a ball, proceeding to the other end of the playing field, and scoring one or more points. Embodiments may include forming a single multimedia content package in which the recorded segments or video clips are stitched together and communicating the package to the mobile device 40. Additionally or alternatively, a play event may include, or reference, a plurality of play events. Typically, mobile device 40 receives play events in real time within milliseconds or seconds after the description is generated and/or media included or referenced in the play event is recorded.

A play event may be associated with one or more event types. For example, in American football, a play event may be associated with "interceptions", "punts", "drives", "scoring plays", "touchdowns", "field goals", "penalties," "personal fouls", "special teams plays," "big offensive plays", and/or "big defensive plays".

A play event may be associated with a particular team. For example, a play event may be associated with a team that has possession of the ball at the beginning and/or end of a particular play. Additionally or alternatively, a play event may be associated with one or more teams to indicate that the one or more teams are highlighted in the play event. Additionally or alternatively, a play event may be associated with a team by an operator. Additionally or alternatively, a play event may be associated with a team automatically.

A play event may be associated with one or more players. For example, one or more players may be highlighted in a play event. Accordingly, the play event may be associated with each of the highlighted players.

A play event may include, or reference, one or more statistics or game states. For example, a play event may include the yards gained during the game play, the distance left to achieve a milestone (e.g., a first down in an American football game), the number of plays that have been played since the most recent milestone, the period or quarter number, the points scored or goals achieved if any, the type of score or goal if any, an indicator as to whether a team has an additional opportunity to score points or achieve a goal, a unique play identifier, one or more penalties issued during the play if any, the score, the position of a ball, advancement of a team, the number of points one or more players have scored, the time of day at the beginning and/or end of the play event, the state of the game play clock at the beginning and/or end of the play event, the number of plays contained in the play event, the length of the play event, the game-clock time or actual time each play event covers, and a time in one or more time zones.

Figure 6:
FIG. 6 presents a real time play event for a recent play during a live sporting event, in an example embodiment.

FIG. 6 presents a real time play event for a professional American football play that may be received by mobile device 40, in an example embodiment. In this example, play event 600 is in eXtensible Markup Language ("XML") format. However, other data interchange formats can be used as well. Play event 600 indicates that a play occurred, provides an identifier for the play, specifies the team to which the play pertains, specifies the team in possession of the ball when the play commenced, indicates that no penalty occurred on the play, specifies that the play did not result in a score, indicates that the play was not the last play of a quarter, specifies that the play did not commence when the team in possession was goal to go with respect to the non-possessing team's end zone, indicates the time left in the current quarter when the play completed, indicates the time of day when the play completed, specifies the current quarter, specifies the current down when the play commenced, indicates the number of yards to go for a first down when the play commenced, and specifies the yard line the play started on. Play event 600 also includes a textual play description. Some or all of this information may be used by a graphical game play feed application to render or display graphical tiles, play event icons, and/or recent play indicators on a display of mobile device 40.

Figure 7:
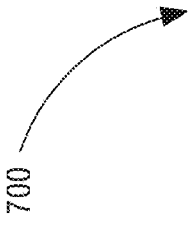
FIG. 7 presents a real time play event for a recent play during a live sporting event, in an example embodiment.

FIG. 7 presents a real time play event for a professional American football play that may be received by mobile device 40, in an example embodiment. In this example, play event 700 is in XML format. However, other data interchange formats can be used as well. Play event 700, among other things, indicates that a play occurred and that the play was a "big" or important play, provides an identifier for the game, provides an identifier for the play, indicates that the play ended in a score, specifies the active team or the team that scored, specifies the home team by an identifier and abbreviation, specifies the visiting team by an identifier and abbreviation, specifies the quarter the play took place in, and specifies the game clock at the beginning of the play. Play event 700 includes a textual play description. Play event 700 also includes a reference to a recorded video of the play described in the description with an address to retrieve the video stored as a uniform resource location ("URL"). The media reference includes a video identifier as well as several textual descriptions related to a referenced video: a headline, a caption for the referenced video, and a descriptive URL. Some or all of this information may be used by a graphical game play feed application to render or display graphical tiles, play event icons, and/or recent play indicators on a display of mobile device 40.

4.0 Process Overview

Play event processing logic 20 may automatically determine the bounds of a play—such as when a play begins and/or ends—based on data received from game data sources 12 and/or external game data sources 50. A play may comprise a segment of a game. It can be difficult, however, to automatically determine when one play ends and another begins. For example, a play in an American football game may begin when a ball is snapped or otherwise delivered from a person in a center position to a person in a back position, such as a quarterback, running back or kicker. Additionally or alternatively, a play may begin when a ball is kicked, such as at a kick-off or free kick. A play may continue until a quarterback fails to make a pass, a ball carrier steps out of bounds, falls, or is tackled or downed, a referee stops game play, a stalemate occurs (for example, when forward progress is stopped), a period ends, and/or one or more other events occur. A play may be a complex combination of events and/or states. For example, in American football, a single play may include possession of a ball by a first team, a loss of ball possession by the first team, an acquired ball possession by a second team, and a progression of the second team down the field.

Figure 1B:
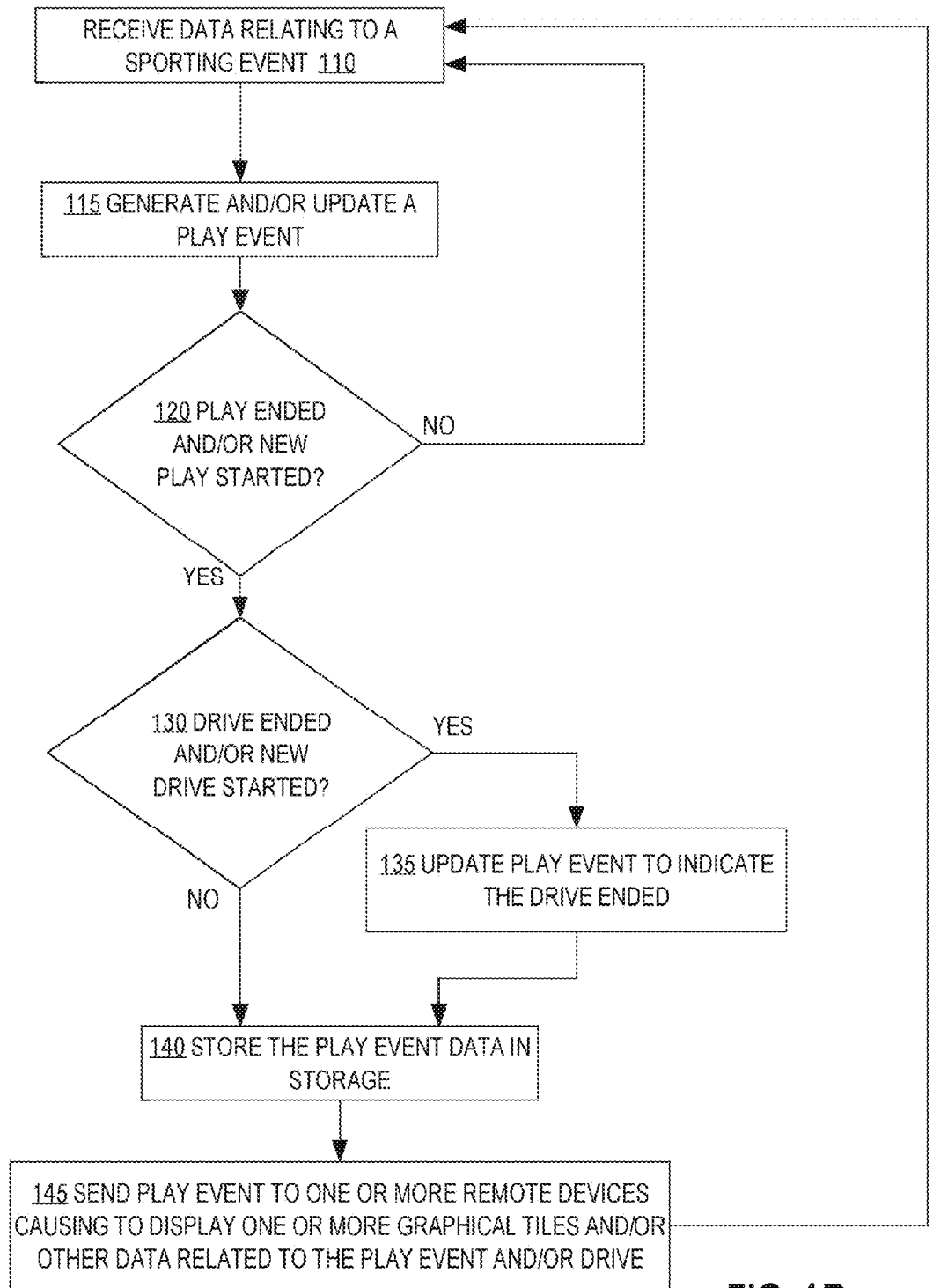
FIG. 1B illustrates a process for receiving data related to a sporting event, and determine beginning and/or end of a play and/or drive, and sending play events that indicate the state of the sporting event and/or one or more plays and/or drives, according to an embodiment.
Figure 1C:
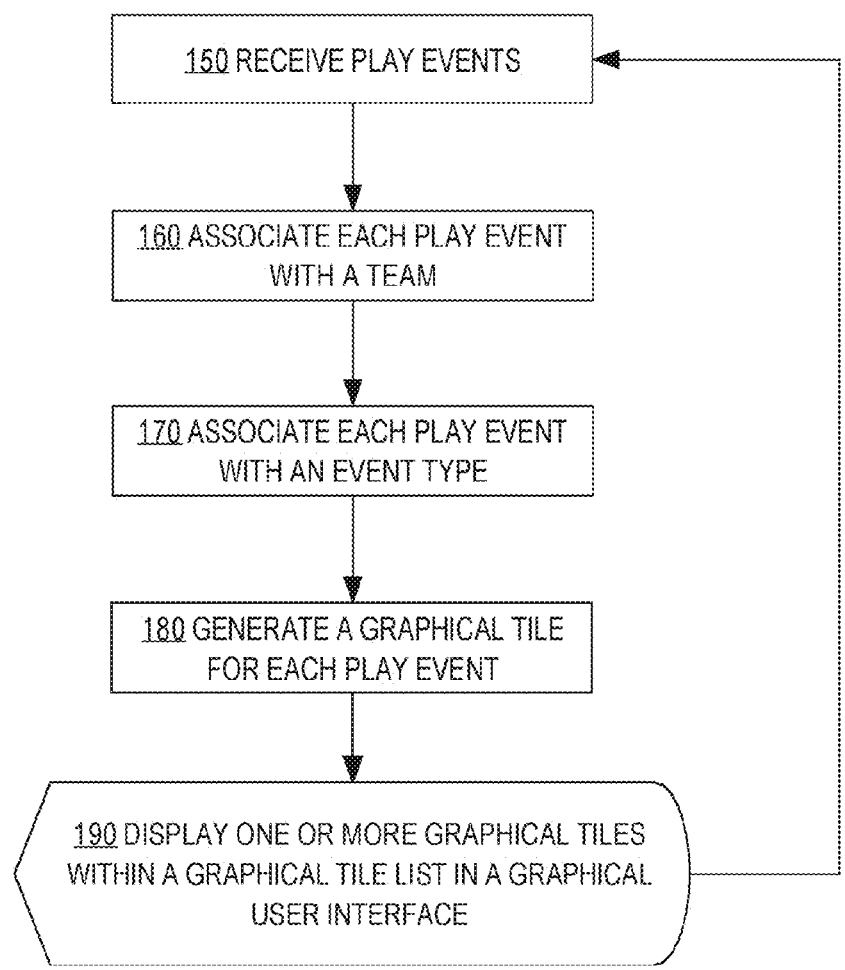
FIG. 1C illustrates a process for receiving play events, and displaying play event icons corresponding to the received play events in a bar within a graphical user interface, according to an embodiment.

FIG. 1B illustrates a process for receiving data related to a sporting event, and determine beginning and/or end of a play and/or drive, and sending play events that indicate the state of the sporting event and/or one or more plays and/or drives, according to an embodiment. FIG. 1C illustrates a process for receiving play events, and displaying play event icons corresponding to the received play events in a bar within a graphical user interface, according to an embodiment.

4.1 Receiving Game Data from One or More Sources

In step 110, a server computer receives data relating to a sporting event. In an embodiment, play event processing logic 20 may receive data indicating one or more states in a game being played in stadium 10. For example, play event processing logic 20 may receive data from external game data sources 50 and/or game data sources 12 through game and data interface logic 18. The data may indicate that the game clock has started to countdown in the first period of the game

4.2 Generating a Play Event

In step 115, the server computer may generate a play event. For example, in response to receiving the data in the previous example, play event processing logic 20 may determine that a first play has started, and generate a data structure, such as a play event, for storing data about the play currently underway in stadium 10. Play event processing logic 20 may assign a play identifier to the play event that identifies the play. The identifier may be an incremental value assigned by play event processing logic 20 and/or value received and/or derived from a data stream. For example, the play identifier may be a timestamp in which the play started. The timestamp may correspond to a segment of multimedia stored in media index and storage logic 60 that include content related to the play, such as video of the play, commentary, and/or effects or additional content related to the play. Accordingly, a remote device may use the timestamp to access multimedia content stored in media index and storage logic 60. Multimedia can many one or more media recorded and/or persistent stored and that can play presented to a user, such pictures, video, and/or audio.

Additionally or alternatively, in response to determining that the game started, play event processing logic 20 may determine that a first drive started. Play event processing logic 20 may generate and/or store an identifier that identifies the drive in the play event. The drive identifier may be a timestamp in which the drive started. The timestamp may correspond to a segment of multimedia related to the drive and stored in media index and storage logic 60. The multimedia may include content related to the drive, such as video, commentary, and/or effects. Accordingly, a remote device may use the timestamp to access multimedia content stored in media index and storage logic 60.

Play event processing logic 20 may wait to send the play event to one or more remote devices, such as mobile devices 40, until play event processing logic receives data indicating that the play and/or drive has ended. Additionally or alternatively, each time play event processing logic 20 updates a play event, play event processing logic 20 may send the updated play event to mobile devices 40, however each play event that describes the same play and/or drive may include the same play identifier and/or drive identifier. For convenience of expression data, sending data, such as a play event, to a device may mean sending the data to the device and/or a specialized application executed on the device.

4.3 Determining when a Play Begins and/or Ends

Play event processing logic 20 may automatically determine the bounds of a play—such as when a play begins and/or ends—based on data received from game data sources 12 and/or external game data sources 50. There may be many ways to determine whether a play has started and/or ended. For example, if play event processing logic 20 determines that new play has started based on data received from one or more sources, then play event processing logic 20 may determine that any previously started plays have now ended. Additionally or alternatively, if play event processing logic 20 determines that a play has ended, then play event processing logic 20 may determine that a new play has started.

Play event processing logic 20 may determine that a current play has ended and/or a new play has started based on one or more different behaviors of a play clock. For purposes of illustrating a clear example, assume that play event processing logic 20 receives game play data through game data interface logic 18 from one or more data sources, such as game data sources 12 and/or external game data sources 50. The game play data may include values derived from an official play clock maintained by game officials for a corresponding game, such as the official stadium play clock. The play clock typically is distinct from the game clock; whereas the game clock indicates the total time remaining in a period (such as a quarter) or a game, the play clock indicates the remaining time in seconds in which the offensive team is permitted to run a play after the end of a previously play. If play event processing logic 20 receives data indicating that a play clock for a particular game maintains a particular value over a particular amount of time, then play event processing logic 20 may determine that a play has stopped or paused. The amount of time may be based on the resolution of the play clock. For example, if a play clock shows a number of seconds, then play event processing logic 20 may determine that a play has stopped if the play clock does not change for two or more seconds. A play clock may stop for one or more reasons. For example, if a timeout is called or a referee makes a call, then the play clock may stop incrementing or decrementing, indicating that a play has stopped.

Additionally or alternatively, if play event processing logic 20 receives data indicating that a play clock was reset, then play event processing logic 20 may determine that a current play has ended and/or a new play has started. Play event processing logic 20 may determine that a play clock has been reset when the play clock is set to a pre-defined value, such as zero, 24 seconds, 25 seconds, 40 seconds, or any other predefined value. For example, in American football according to certain rules a play clock maintained by the official scorer may be reset to "40" or "25" after a play has finished indicating that a current play has ended and a new play may commence within the indicated number of seconds; in a professional basketball league, a play clock may be reset to "24", indicating that a team has twenty-for seconds to attempt to score. As with other rules discussed herein, play event processing logic 20 may determine when a play has started and/or stopped may be based on the particular sport and/or league that the data is being received for.

Additionally or alternatively play event processing logic 20 may determine that the play clock is reset and/or a new play is starting if the value of the clock changes in an expected way. For example, if the play clock is counting down from 40 seconds by one second intervals, the play clock is currently at 10 seconds, and the value of the play clock is changed to a value that is greater than 10 seconds or less than 9 seconds, then play event processing logic 20 may determine that a play has ended and/or a new play has started. A play clock may change in an unexpected way for many reasons. For example, if a player is given more time at the end of a period, turn, possession, and/or round, then an increment in the play clock time may indicate that a play has ended and/or a new play has started.

If play event processing logic 20 receives data indicating that a play clock started to increment or decrement after determining that the play clock has stopped and/or reset, then play event processing logic 20 may determine that a play has stopped and/or a new play has started. A play clock may start for many reasons. For example, after a timeout or break is over, a play clock may begin to increment or decrement depending on the rules for the sport and/or league.

If play event processing logic 20 receives data indicating that a penalty flag is set, then play event processing logic 20 may determine that a play has stopped and/or a new play has started. A penalty flag may indicate that an official called a foul, and/or violation which may cause a play to stop.

If play event processing logic 20 receives data indicating that a review flag is set, then play event processing logic 20 may determine that a play has stopped and/or a new play has started. A penalty flag may indicate that an official called a foul, and/or violation, which may cause a current play to stop. Additionally or alternatively, if play event processing logic 20 receives data indicating that a review flag is cleared, then play event processing logic 20 may determine that a new play has started.

If play event processing logic 20 receives data indicating that a timeout flag is set, then play event processing logic 20 may determine that a play has stopped and/or a new play has started. A timeout flag may indicate that no play will take place for a particular amount of time; accordingly, a play that was in progress may be stopped when the timeout flag is set; additionally or alternatively, if play event processing logic 20 receives data indicating that the timeout flag is cleared, then play event processing logic 20 may determine a new play has started.

If play event processing logic 20 receives data that a turnover flag is set, indicating that a change in possession of the ball occurred, then play event processing logic 20 may determine that a play has stopped and/or a new play has started. Additionally or alternatively, play event processing logic 20 may associate the new play with the team that opposes the team associated with the previous play.

If play event processing logic 20 receives data that a possession value changes indicating a different team now has possession of a ball, then play event processing logic 20 may determine that a play has stopped and/or a new play has started. Additionally or alternatively, play event processing logic 20 may associate the new play with the team that opposes the team associated with the previous play.

If play event processing logic 20 receives data that a down value and/or a progress value changes, then play event processing logic 20 may determine that a play has stopped and/or a new play has started. For example, if a down value changes from one to two, and a progress value changes from twenty-five to twenty, then a first down play with a gain of five yards may have finished, and a new play may have or will soon be in progress.

If play event processing logic 20 receives data that a score related to one or more teams changes, then play event processing logic 20 may determine that a play has stopped and/or a new play has started. For example, in some sports, if one individual and/or team scores, then the opposing individual and/or team is given possession of the ball to make a new play.

If play event processing logic 20 receives data that a period value changes, then play event processing logic 20 may determine that a play has stopped and/or a new play has started. In an embodiment, changing a period value indicates that game play has stopped. Accordingly, play event processing logic 20 may determine that a play ends when the period value changes. However, in an embodiment, the period value may change at the beginning of a new period, in which a team will execute a play. Accordingly, play event processing logic 20 may determine that a new play has started.

If play event processing logic 20 receives a period value and/or other value indicating that a game is finished, then play event processing logic 20 may determine that a play has stopped. For example, a value may be associated and/or received with a score, which indicates that the score is the final score. Additionally or alternatively, in response to receiving a period value and/or other value indicating a game is finished, play event processing logic 20 may determine that the last play and/or drive of the game has stopped.

Returning now to FIG. 1B, in step 120, the server computer determines if a play has ended and/or a new play has started. If so, then control may proceed to step 120; otherwise, control may return to step 110. For purposes of illustrating a clear example, assume play event processing logic 20 receives game data through game data interface logic 18, indicating that a play clock was reset. In response, play event processing logic 20 may determine that the first play has ended. Play event processing logic 20 may update the play event to include an ending timestamp. The ending timestamp may correspond to a segment of multimedia content stored in media index and storage logic 60 that include content related to the play. Accordingly, a remote device may use the ending timestamp to access multimedia content stored in media index and storage logic 60. With both the starting timestamp and the ending timestamp in the play event, a remote device may randomly access each video segment stored in media index and storage logic 60 in the range of video segments between the starting timestamp and the ending timestamp. The range may include the starting timestamp and/or the ending timestamp. Additionally or alternatively, play event processing logic 20 may update the play event with other data about the play, such as the progression of one team on the field. Accordingly, in this example, control may proceed to step 130.

4.4 Determining a Drive Begins and/or Ends

A drive may comprise a series of consecutive plays that may include a set of field movements. The series of plays in a drive may be continuous or segmented in time. For example, a drive may begin when a team gains possession of the ball, and may conclude when one or more conditions are satisfied, such as the possessing team scores a goal, the possessing team loses possession of the ball, and/or a particular time period ends. Other sports may determine the end of a drive when another team scores. For example, in basketball, possession of the ball may change frequently; however, a drive may begin when a first team continues to score while a second team fails to score. The drive may end when the second team begins to score.

Play event processing logic 20 may automatically determine when a drive begins and/or ends based on data received from game data sources 12 and/or external game data sources 50. For purposes of illustrating a clear example, assume that play event processing logic 20 receives game play data through game data interface logic 18 from one or more data sources: game data sources 12 and/or external game data sources 50. Upon receiving and/or processing any of the game play data discussed herein, play event processing logic 20 may determine that a current drive has ended and/or a new drive has started. For example, if play event processing logic 20 receives data indicating that a period value has changed and/or a possession value has changed indicating a different team now has possession of a ball, then play event processing logic 20 may determine that a current drive, if any, is over, and/or a new drive started. Additionally or alternatively, if play event processing logic 20 receives data indicating that a period is over, a score is final, and/or a game is over, then play event processing logic 20 may determine that a drive has ended. If play event processing logic 20 receives data indicating that a penalty flag is set, then play event processing logic 20 may determine that a drive has ended. If play event processing logic 20 receives data indicating that a score related to one or more teams has changed, then play event processing logic 20 may determine that a drive has ended and/or a new drive has started.

Returning now to FIG. 1B, in step 130, the server computer determines if a drive ends and/or a new drive begins. If so, then control may proceed to step 135; otherwise, control may proceed to step 140. For purposes of illustrating a clear example, assume play event processing logic 20 receives game data through game data interface logic 18, indicating that a play ended with a different team possessing the ball than the team that started with the ball. In response, play event processing logic 20 may determine that the drive has ended. Additionally or alternatively, play event processing logic 20 may determine that a new drive has started.

In step 135, the server computer may update the play event to indicate the drive ended. For example, play event processing logic 20 may update the play event to include an ending drive timestamp. The ending drive timestamp may correspond to a segment of multimedia stored in media index and storage logic 60 that includes content related to the drive. The ending drive timestamp may be the same as the ending timestamp or the play. Accordingly, a remote device may use the ending timestamp to access multimedia content stored in media index and storage logic 60. Play event processing logic 20 may store data in the play event that includes the drive starting timestamp. In an embodiment, a remote device may determine the beginning timestamp of the drive by determining the earliest starting timestamp of each play event received with the same drive identifier.

With both the starting timestamp and the ending timestamp of the drive, a remote device may randomly access the each video segment stored in media index and storage logic 60 in the range of video segments between the starting timestamp and the ending timestamp of the drive. The range may include the starting timestamp and/or the ending timestamp of the drive. Additionally or alternatively, play event processing logic 20 may update the play event with other data about the drive, such as the progression of one team on the field. Additionally or alternatively, a remote device may randomly access the video segments in each play associated with the drive. Accordingly, the user of the remote device may see each play in the drive back-to-back, without downloading and/or viewing multimedia content that may be extraneous and/or irrelevant to the drive.

4.5 Creating Indexes into Multimedia Content Based on Data in a Play Event

In step 140, the server computer may store the play event in storage. For example, play event processing logic 20 may store the play event in media index and storage logic 60. Additionally or alternatively, play event processing logic 20 may cause one or more indexes to be mapped to the play identifier and/or the drive identifier in the play event. Accordingly, if media index and storage logic 60 receives a request from a remote device for multimedia content for a particular play and/or drive with a particular play identifier and/or drive identifier, then media index and storage logic 60 may return the multimedia segments defined by each play event stored in media index and storage logic 60 with the same play identifier and/or drive identifier. Accordingly, a user and/or the user's device, need not request, download, and/or watch multimedia content from other plays and/or drives.

Additionally or alternatively, media index and storage logic 60 may index multimedia content based on other data in a play event. For example, a mobile device may receive a play event that identifies a first play and includes a first timestamp, which indicates when a play began, and a second timestamp, which indicates when the play ended. In response to a user selecting an input associated with the play event, such as a graphical tile, the mobile device may request and receive content from media index and storage logic 60 that is indexed with a timestamp that is greater than or equal to the first timestamp (the start time for the play identified in the play event) and less than or equal to the second timestamp (the end time for the play identified in the play event). Also for example, media index and/storage logic 60 may index multimedia content based on which team has possession, what yard line the ball is set to, and/or any other data that identifies a play, drive, and/or a segment of multimedia related to a game played in stadium 10.

4.6 Updating an Interface on One or More Remote Devices

In step 145, play event processing logic 20 sends the play event to one or more remote devices causing to display one or more graphic tiles and/or other data related to the play event and/or drive. For example, play event processing logic 20 may send the play event sent in the previous step to mobile devices 40. In an embodiment, play event processing logic 20 may notify presentation logic, and presentation logic 22 may cause a graphical tile (discussed in detail herein) to be displayed on one or more mobile devices 40.

Play event processing logic 20 may send a partial play event. A partial play event may be a play event with some data, but not all the data the play event may otherwise include, and therefore, for brevity, a partial play event may be referred to as a play event. For example, at the end of a play, play event processing logic 20 may send a partial play event to mobile devices 40 that includes the forward progress of a team, the game clock state, and the play clock state, but not details on who made the progress, which players were integral in the particular play, and/or multimedia content highlighting the play. A device, such as mobile device 40 may present data to users based on data that was provided in the partial play event before receiving additional data about the play and/or drive.

A mobile device may update a graphical tile with additional data received over time. For example, the device may poll play event processing logic 20, presentation logic 22 and/or media index and storage logic 60 for additional data. In response to receiving additional data, the device may update the corresponding graphical tile. The additional data may include statistics, textual descriptions, multimedia, and/or any other data discussed herein.

4.7 Distributing Play Events and/or Play/Drive State Data

One or more devices may poll play event processing logic 20 for the state of a game, play, or drive. In response, play event processing logic 20 may respond with data indicating whether a play is in progress and/or an identifier that identifies which play is in progress, if any. Play event processing logic 20 may send an identifier that identifies the play, along with data about the play, such as whether a play has started or stopped, a start time, stop time, data indicating which camera feeds are available to review the play, a URL to retrieve pictures, audio, and/or video for the play taken during and/or related to the play, and/or any other data associated with the play.

If play event processing logic 20 determines that a play has ended, but a new play has not started, then play event processing logic 20 may respond to a request for additional content with data indicating that a play is not currently in progress. For example, if play event processing logic 20 receives data indicating that the play clock has not changed and a timeout flag was set, but the timeout flag has not been cleared, then play event processing logic 20 may determine that the last play has ended but a new play has not yet started. Accordingly, play event processing logic 20 may send a value to a polling logic or device that a play is not currently in progress.

Play event processing logic 20 may send one or more messages to one or more modules, logics, and/or devices indicating the state of one or more plays without being polled. For example, in response to determining a play stopped or a new image related to the play has been received, play event processing logic 20 may send a message to presentation logic 22, media index and storage logic 60, and/or mobile devices 40 indicating that the last play has stopped and/or a link to the new image.

4.8 Displaying Content Based on Play Events Received from the Server Computer Referring now to FIG. 1C, in step 150, an application receives play events. For example, the application receives a plurality of play events from a server or a server application.

In step 150, the application may disregard play events that are not important. Each play event may include a field, which when selected or set to a particular value designates that the play event is important. Additionally or alternatively, one or more play events may be nested in a data structure designating that the play event is important. Additionally or alternatively, the application may determine a play event is important based, at least in part, on the play event's description. For example, the application may determine that a play event is important if the description includes particular words, such as "goal." Accordingly, if the application determines that a play event is important then the application may continue to process the play event, otherwise the application may discard or ignore the play event, at least with respect to generating graphical tiles.

In step 160, the application associates each play event with a team. For example, the application may determine which team a play event should be associated with based, at least in part, on the play event description and/or other data included in the play event. Additionally or alternatively, a play event may include a field that designates an associated team.

In step 170, the application associates each play event with an event type. For example, the application may determine which event types a play event should be associated with based, at least in part, on the play event description and/or other data included in the play event. Additionally or alternatively, a play event may include a field that designates one or more event types. For example, a play event may include a field that designates that the play event describes an "interception" and "scoring" play, each of which may be an event type.

In step 180, the application generates a graphical tile for each play event. For example, for each play event the application may generate a graphical tile based, at least in part, on the team associated with the play event (determined in step 160) and/or the event type(s) associated with the play event (determined in step 170). Additionally, the application may select a play event icon for one or more of the play events. For example, if a play event is determined to be important, then the application may select a play event icon based, at least in part, on the team associated with the play event and/or the event type(s) associated with the play event.

In step 190, the application displays one or more graphical tiles within a graphical tile list in a graphical user interface. For example, the application may include each of the generated graphical tiles in the graphical list. The application may cause to display all of the generated graphical tiles or a subset of the generated graphical tiles in the graphical tile list based, at least in part, on the display area of the device the application is running on and/or the portion or the display area allocated to display the graphical tiles or graphical tile list. As seen in an embodiment illustrated in FIG. 4A, discussed in detail below, four graphical tiles may not be completely displayed simultaneously. The position of each graphical tile in the graphical tile list may be based, at least in part, on the data, such as the game play clock, in each corresponding play event.

Additionally, the application may display the play event icons within a bar in the graphical user interface. For example, for each play event that a play event icon was selected for, the application may display the selected play event icon in a scroll bar. The position of each play event icon in the scroll bar may be based, at least in part, on the data in each corresponding play event.

Control may return to step 150, and the application receive one or more new play events. For example, the application may receive one or more new play events. Accordingly, the application may repeat steps 160 through 190 for the newly received play events.

4.9 Updating Play Event Icons and Generating Markers

Figure 2:
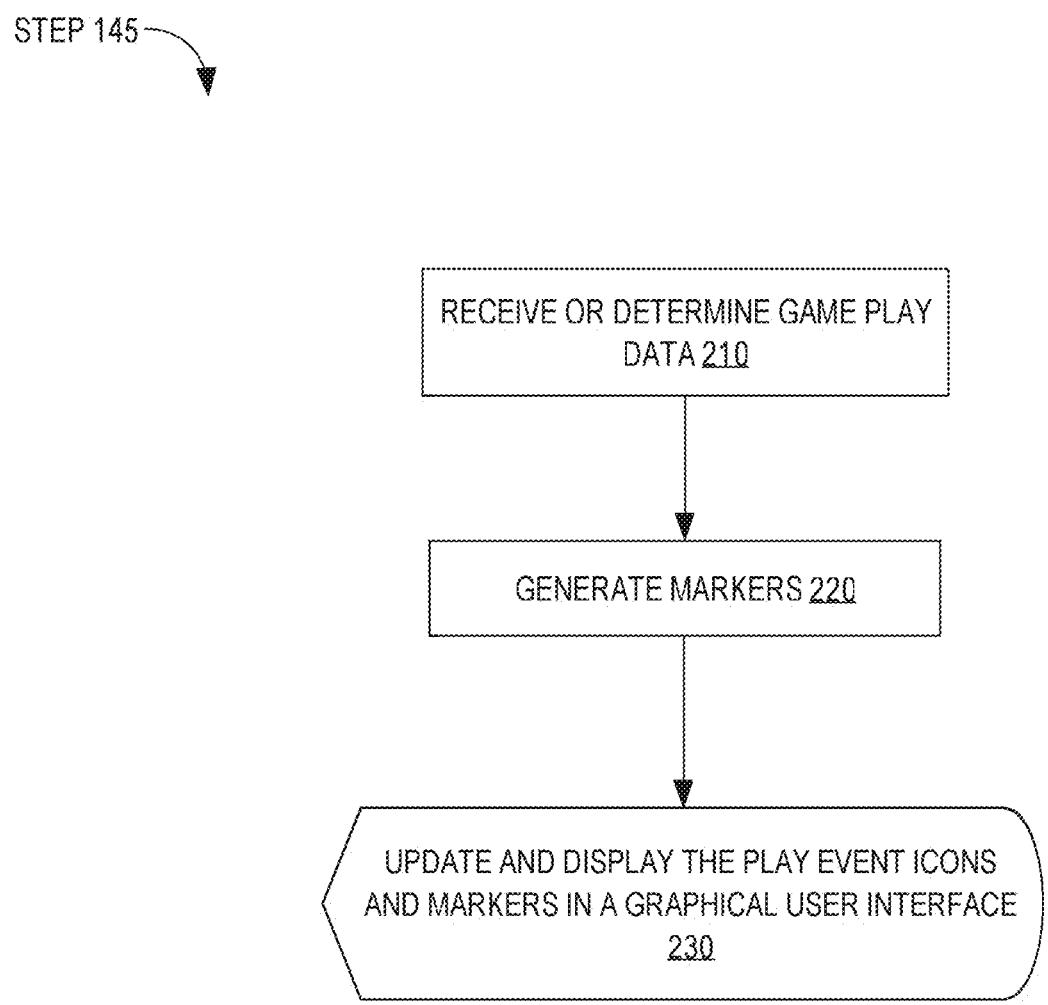
FIG. 2 illustrates a process for receiving and/or determining game play data, generating markers, updating existing play event icons and markers, and displaying the updated play event icons and markers, in an example embodiment.

The appearances of play event icons, markers, or any other visual elements (discussed in herein), are driven from game play data and may occur automatically in response to parsing the game play data. FIG. 2 illustrates a process for receiving and/or determining game play data, generating markers, updating existing play event icons and markers, and displaying the updated play event icons and markers, in an example embodiment. While FIG. 2 illustrates example steps according to an embodiment, other embodiments may omit, add to, reorder, and/or modify any of the steps shown. Referring now to FIG. 2, in step 210, an application receives and/or determines game play data. For example, an application may receive game play data from a server or a server application. The game play data may be in formatted XML and/or any other proprietary or conventional data interchange formats readable by the application. The game play data may include play events or other data related to the game, such as the current game clock time, the current score, or the current position of a team or ball.

In step 220, the application generates markers. For example, in response to receiving game play data that the game clock has been reset for a new quarter, the application may generate a marker, which indicates the beginning of the new quarter.

In step 230, the application updates and displays the play event icons and markers in a graphical user interface. For example, in response to generating one or more markers in step 220, the application may display the one or more markers. The marker(s) displayed may be in a scroll bar and/or inserted into a graphical tile list to visually demarcate play event icons and/or graphical tiles corresponding to play events with game clock times in a particular quarter or period. Furthermore, in response to receiving the game play data in step 220, the application may update the position of the play event icons, graphical tiles, and/or previously displayed markers.

4.10 Filtering Graphical Tiles

Figure 3:
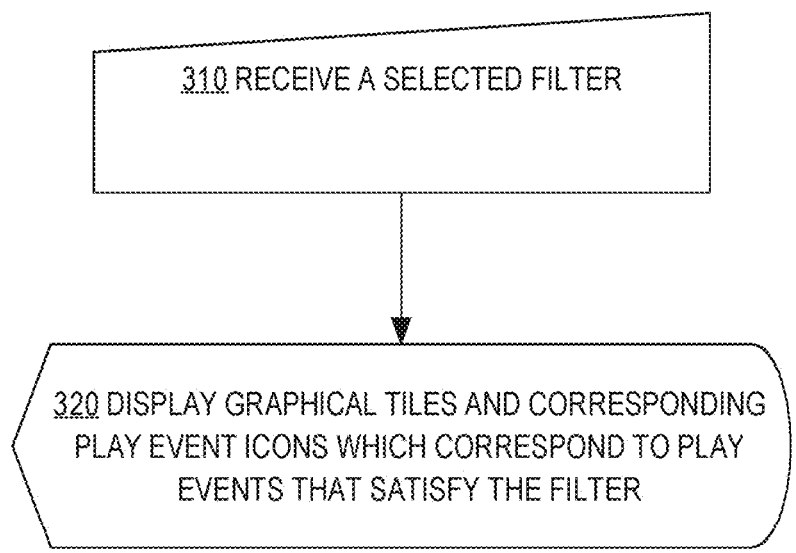
FIG. 3 illustrates a process for receiving and applying a filter to the received play events, and displaying the graphical tiles and/or the play event icons that correspond to the play events that satisfy the filter, in an example embodiment.

Graphical tiles may be filtered based, at least in part, by event type, team, player, game clock time, media included or referenced, and/or any other data or attribute included, referenced, or associated with a play event. FIG. 3 illustrates a process for receiving and applying a filter to the received play events, and displaying the graphical tiles and/or the play event icons that correspond to the play events that satisfy the filter, in an example embodiment. While FIG. 3 illustrates example steps according to an embodiment, other embodiments may omit, add to, reorder, and/or modify any of the steps shown. Referring now to FIG. 3, in step 310, an application receives a selected filter. For example, an application may receive user input selecting all play events that include or reference a type of content (e.g., video), are associated with a particular team, and/or are associated with one or more event types (e.g., scoring plays).

In step 320, the application displays one or more graphical tiles and corresponding play event icons which correspond to play events that satisfy the filter. For example, in response to receiving the filter in the previous example, the application may remove from the graphical list any graphical tile that does not correspond to a play event that is not associated with the particular team, is not scoring play, or does not include or reference a video replay. The application may also remove from display any play event icon that does not correspond to a play event that is not associated with the particular team, is not scoring play, or does not include or reference a video replay. Furthermore, the application may cause to display any graphical tile in the graphical tile list that corresponds to a play event that is associated with the particular team, is a scoring play, and includes or references a video. The application may also cause to display any play event icons that corresponds to a play event that is associated with the particular team, is a scoring play, and includes or references a video.

5.0 Example Graphical User Interface with Scrollable Graphical Tiles

Play events may be displayed in an application executed on a mobile device 40 for users to scroll through and view. FIG. 4A, FIG. 4B, FIG. 4C, FIG. 4D, FIG. 4E, and FIG. 4F illustrate a graphical tile list that includes a plurality of graphical tiles in various example embodiments. FIG. 4A, FIG. 4B, FIG. 4C, and FIG. 4D also illustrate a graphical tile list that includes an annotated scroll bar and game-state markers, in various example embodiments. FIG. 4A, FIG. 4B, FIG. 4C, FIG. 4D, FIG. 4E, and FIG. 4F illustrate various example embodiments for purposes of illustrating clear examples, other embodiments may omit add to, reorder, and/or modify any of the elements shown. In the embodiments illustrated in FIG. 4A, FIG. 4B, FIG. 4C, FIG. 4D, FIG. 4E, and FIG. 4F, application 400 includes graphical tile list 405. Additionally, in the embodiments illustrated in FIG. 4A, FIG. 4B, FIG. 4C, and FIG. 4D, application 400 includes bar 450. Bar 450 includes play event icons 460, 462, 464, 466, and 468, and markers 471, 472, and 473.

5.1 Graphical Tiles

Figure 4A:
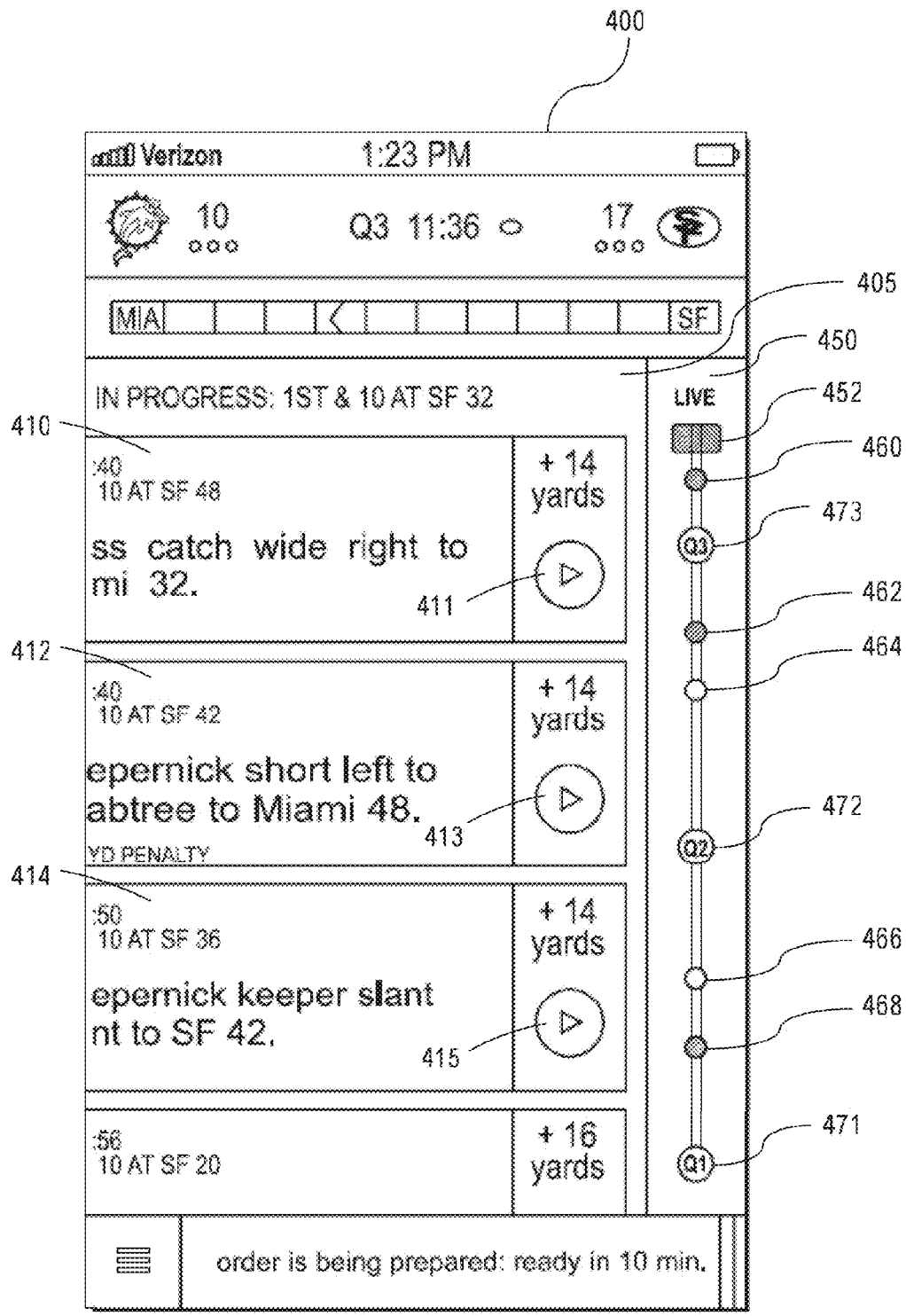
FIG. 4A illustrates a graphical tile list that includes a plurality of graphical tiles and an annotated scroll bar with a compressed frame and game-state markers, in an example embodiment.
Figure 4B:
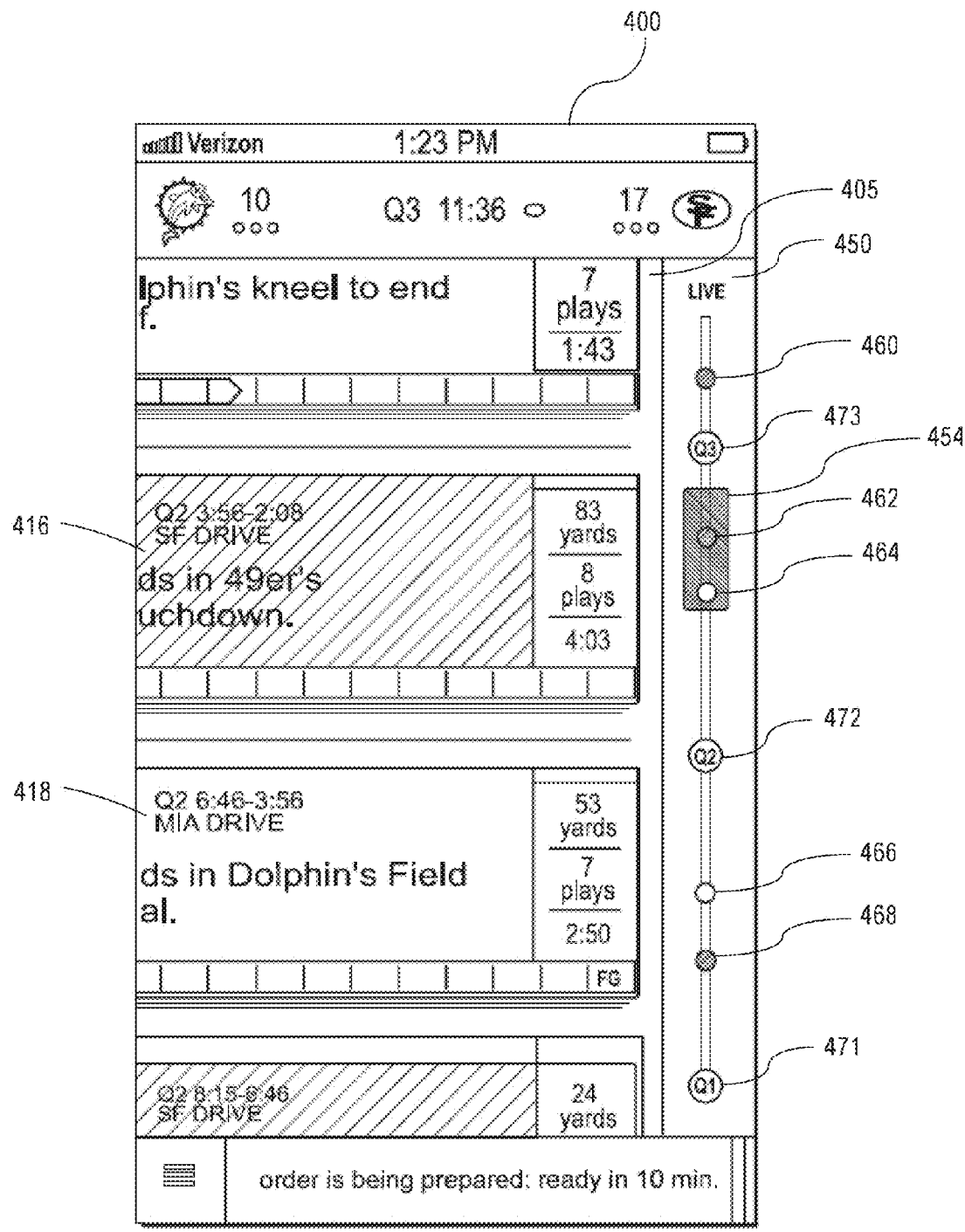
FIG. 4B illustrates a graphical tile list that includes a plurality of graphical tiles and an annotated scroll bar with an expanded frame and game-state markers, in an example embodiment.
Figure 4C:
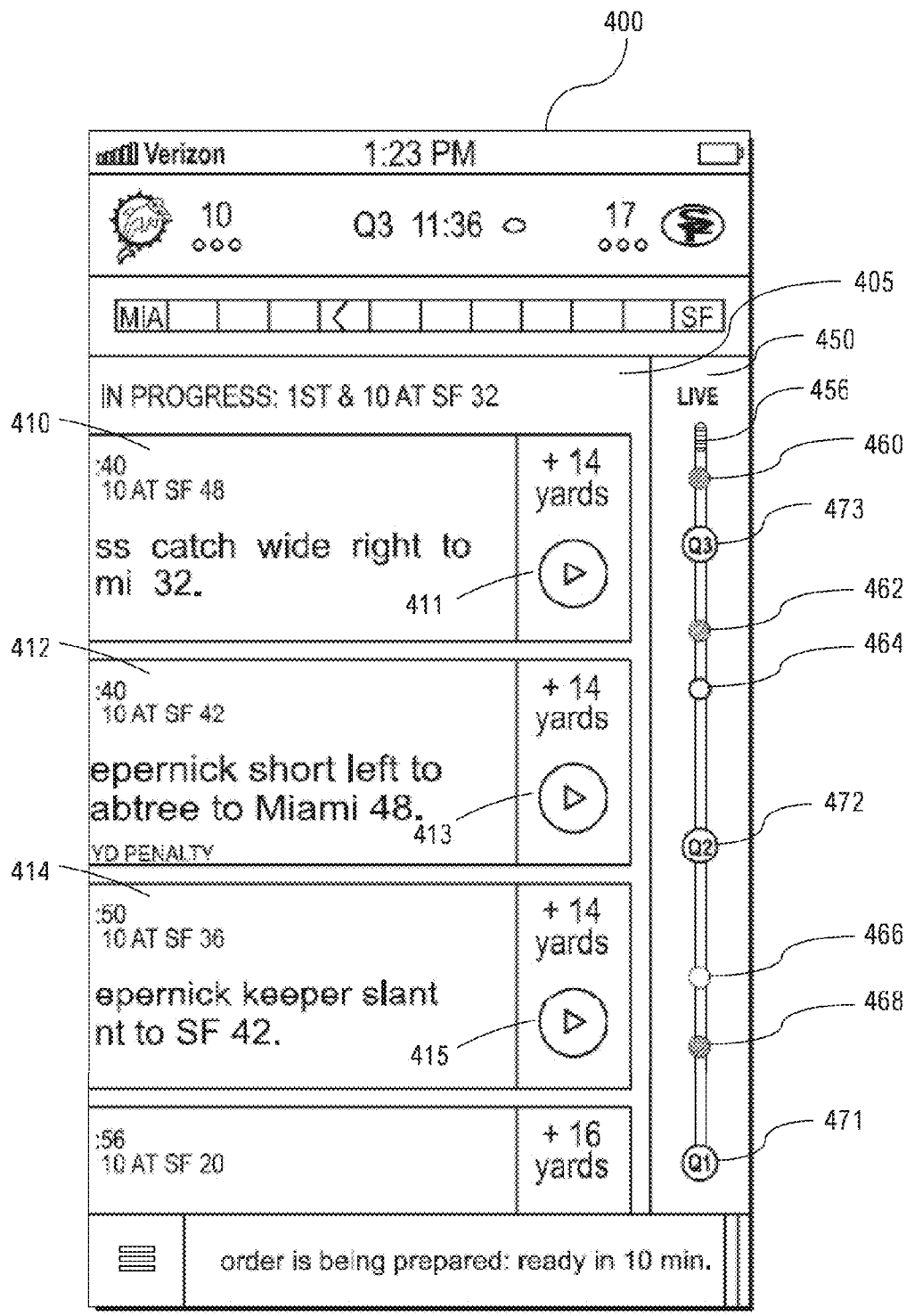
FIG. 4C illustrates a graphical tile list that includes a plurality of graphical tiles and an annotated scroll bar with a compressed indicator and game-state markers, in an example embodiment.
Figure 4D:
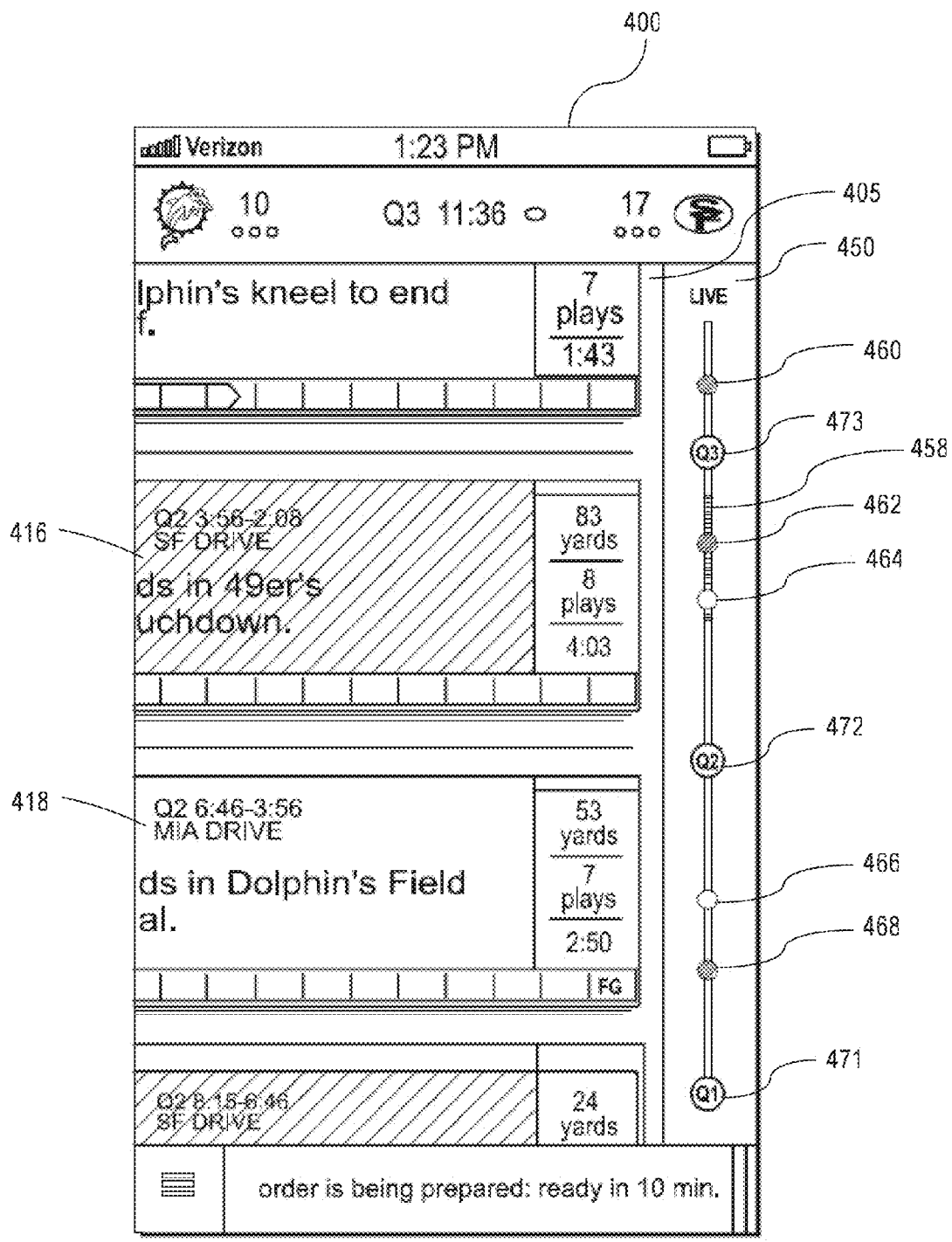
FIG. 4D illustrates a graphical tile list that includes a plurality of graphical tiles and an annotated scroll bar with an expanded indicator and game-state markers, in an example embodiment.

In FIGS. 4A and 4C, graphical tile list 405 includes graphical tile 410, graphical tile 412, and graphical tile 414. In FIG. 4B and FIG. 4D, graphical tile list 405 includes graphical tile 416 and graphical tile 418. Graphical tiles 410, 412, 414, 416, and 418 may each be associated with, and/or correspond to, a play event, and may include or reference the data included or referenced in the play event. For example, graphical tiles 410, 412, 414, 416, and 418 each include a description from the corresponding play event, which refers to one or more plays during a game. The appearance of graphical tiles or any other visual elements, such as a description in a graphical tile, or presence or absence of an icon (discussed in detail herein), is driven from game play data and may occur automatically in response to parsing the game play data.

Graphical tiles 410, 412, 414, 416, and 418 may each include other information determined by application 400 or included in the corresponding play event. For example, a graphical tile may include the corresponding play event statistics, such as the state of the game play clock, the position of the ball, and/or the score at the end of the play event. As illustrated in FIG. 4B and FIG. 4D, graphical tile 416 displays data included in a play event that includes or references media that spans from 3:56 in the second quarter to 2:08 in the second quarter. Also as illustrated in FIG. 4B and FIG. 4D, graphical tile 418 displays data included in a play event that includes or references media that spans from 6:42 in the second quarter to 3:56 in the second quarter.

Graphical tiles may be color coded based, at least in part, on the corresponding play event. For example, graphical tile 416 is shaded differently than graphical tile 418. Also, for the purpose of illustrating a clear example, assume that the play event corresponding with graphical tile 416 is associated with the first team. Accordingly, the application 400 may display graphical tile 416 with a first color. Further assume that the play event corresponding with graphical tile 418 is associated with a second team. Accordingly, the application 400 may display graphical tile 418 with a second, different color. The color(s) of a graphical tile may be determined based, at least in part, on the graphical tile's corresponding play event, the team color(s) of the team associated with the corresponding play event, and/or some other internal or external mapping.

Graphical tiles may be visually different based, at least in part, on the event types associated with the corresponding play event. For example, a graphical tile may include one or more icons, such as an icon with an upright stand to indicate that the corresponding play event is associated with a field goal or extra point. A graphical tile may include an icon with arms extended upright to indicate that the corresponding play event is associated with a score, such as a touchdown. A graphical tile may include an icon with arms crossed to indicate that the corresponding play event is associated with a personal foul. Additionally or alternatively, a graphical tile may include an icon, such as a logo, for the team associated with the corresponding play event. Graphical tiles may include a plurality of icons and/or colors. Additionally or alternatively, a graphical tile may include an icon, such as icon 924, which indicates that one or more players were injured during the portion of the game associated with the play event. Additionally or alternatively, a graphical tile may include an icon, such as icon 944, which indicates that a game rule was violated, or at least a violation or penalty was called by a referee, during the portion of the game associated with the play event.

Graphical tiles may be visually different based, at least in part, on one or more indicators included in a graphical tile. An indicator may indicate statistics or attributes of a portion of the game associated with a play event. For example, graphical tiles 920, 930, and 950 include indicators 922, 932, and 952, respectively, which show the yardage gained or lost during the portion of the game corresponding to each play event. Graphical tile 940 includes indicator 942, which indicates that a play ended in an incomplete pass. Other indicators may describe other features of a drive or play, such as the total distance of the drive, duration of a play, number of new plays (for example, indicator 1042), or number of plays that are "big" plays (for example, indicator 1052).

Graphical tiles may be visually different based, at least in part, on the type of recorded media referenced or included in the corresponding play event. For example, a graphical tile may include an icon of a film strip to indicate that the corresponding play event references or includes a recorded video segment. A graphical tile may include an icon of a picture to indicate that the corresponding play event references or includes one or more still frame pictures. A graphical tile may include an icon of a speaker to indicate that the corresponding play event references or includes a recorded audio segment. Additionally or alternatively, a graphical tile may include an icon, such as a logo, for the team associated with the corresponding play event. Graphical tiles may include a plurality of icons and/or colors.

Graphical tiles may be visually different based on user preference. For example, graphical tiles 410, 412, and 414 are visually different than graphical tiles 416 and 418. Graphical tiles 410, 412, and 414 include links 411, 413, and 415, respectively, which may link to a video and/or audio recording of one or more plays. Accordingly, when any of links 411, 413, or 415 are selected by a user, application 400 may present the linked media to the user. In contrast, the entire graphical tile of graphical tiles 416 and 418 may be a link to the media referenced in the corresponding play event. Accordingly, when either of graphical tiles 416 or 418 is selected by a user, application 400 may present the linked media to the user. For example, if a user selects graphical tile 418, application 400 may adjust the size of graphical tile 418 and display the linked media, and/or the controls to the linked media, inside graphical tile 418.

A graphical tile may correspond to a play event that comprises a set of play events. For example, in response to a user selecting either graphical tiles 416 or 418, each of which may correspond to a play event that comprises a set of play events, application 400 may display new graphical tiles to the user. Each of the new graphical tiles may correspond to a play event in the set of play events. Each of the play events in the set of play events may correspond to a play in a drive. In response to a user selecting one of the new graphical tiles, application 400 may present the user with the media included or referenced in the corresponding play event. Additionally or alternatively, in response to a user selecting either graphical tile 416 or 418, application 400 may display a drive chart. A drive chart, described in detail below, illustrates the forward progress of each play in a set of plays.

Additionally or alternatively, in response to a user selecting either graphical tiles 416 or 418, each of which may correspond to a play event that comprises a set of play events, new graphical tiles may be displayed to the user. Each of the new graphical tiles may correspond to a play event in the set of play events. Each of the play events in the set of play events may correspond to the same play or segment of the game, but from a different perspective, such as different camera angle and/or commentator. In response to a user selecting one of the new graphical tiles, application 400 may present to the user the media included or referenced in the corresponding play event.

Graphical tiles 410, 412, 414, 416, and 418 may be ordered within graphical tile list 405 in a chronological order. For example in FIG. 4B and FIG. 4D, graphical tile 416 corresponds with a play event that is more recent than graphical tile 418. In the embodiment illustrated in FIG. 4B and FIG. 4D, graphical tile list 405 lists graphical tiles in reverse chronological order. Accordingly, graphical tile 416 is listed before graphical tile 418 in graphical tile list 405.

5.2 Super Graphical Tiles and Nested Graphical Tiles

Figure 4E:
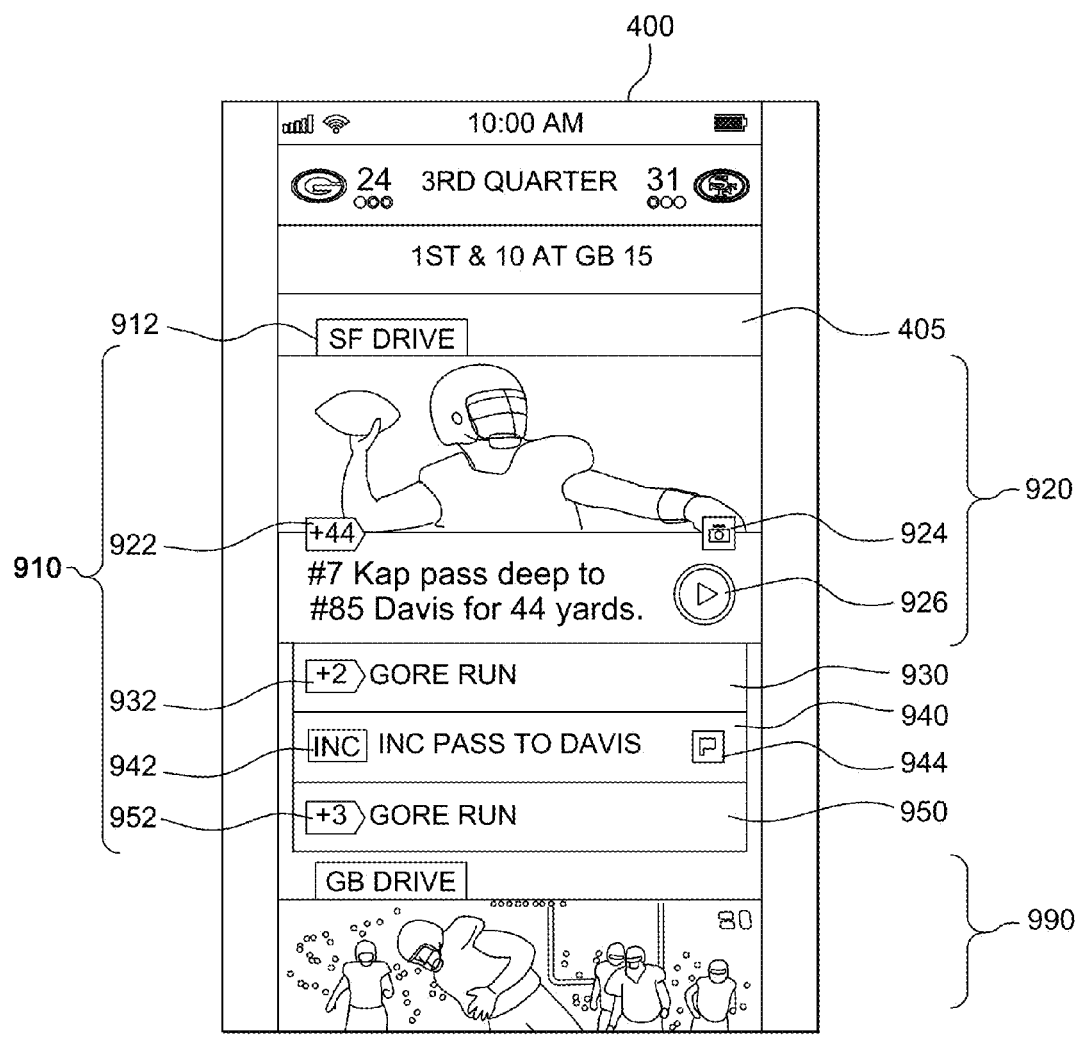
FIG. 4E illustrates a graphical tile list that includes a plurality of graphical tiles, including super graphical tiles and nested graphical tiles, in an example embodiments.

In an embodiment, a super graphical tile may be a graphical tile that may reference or include one or more other graphical tiles. A super graphical tile may comprise any of the features discussed herein regarding graphical tiles and therefore, for brevity, a super graphical tile may be referred to as a graphical tile. For example, a super graphical tile may correspond to a drive that comprises a set of plays. Each play in the set of plays may correspond to a play event in a set of play events. And, each play event may be graphically illustrated as a graphical tile, or nested graphical tile. A nested graphical tile may be a graphical tile that is illustrated as part of, or included in, another graphical tile, or super graphical tile. A nested graphical tile may comprise any of the features discussed herein regarding graphical tiles and therefore, for brevity, a nested graphical tile may be referred to as a graphical tile. For example, FIG. 4E illustrates graphical tile list 405, which includes super graphical tile 910 and super graphical tile 990, each of which represent a drive, in an example embodiment. Super graphical tile 910 corresponds to a drive that comprises four plays. Each play, of the four plays in the drive, corresponds to a play event that is represented by a nested graphical tile: graphical tile 920, graphical tile 930, graphical tile 940, and graphical tile 950.

Figure 4F:
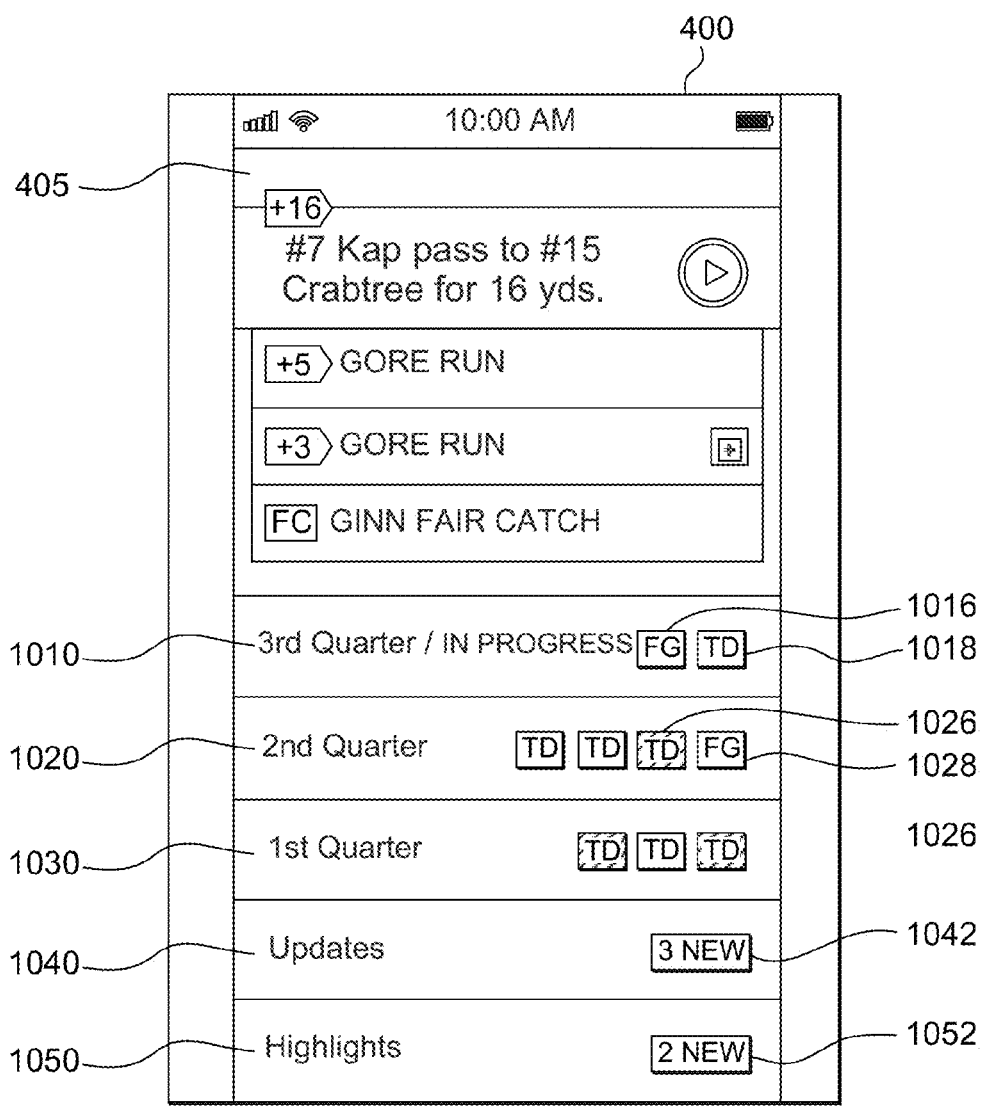
FIG. 4F illustrates a graphical tile list that includes a plurality of graphical tiles, including super graphical tiles and nested graphical tiles, in an example embodiments.

A super graphical tile may reference or include one or more other super graphical tiles. For example, FIG. 4F illustrates graphical tile list 405, which includes super graphical tile 1010, super graphical tile 1020, and super graphical tile 1030. Each super graphical tile of super graphical tiles 1010, 1020, and 1030, represent time periods within a game and include links to graphical tiles, or super graphical tiles, that correspond with drives or plays in a game. As a specific example, super graphical tile 1010 includes link 1016, which may be a link to a super graphical tile that corresponds to a drive in the third quarter that ends in a field goal. As another specific example, super graphical tile 1010 includes link 1018, which may be a link to a super graphical tile that corresponds to a drive in the third quarter that ends in a touchdown. Alternatively, link 1018 may be a link to a graphical tile that corresponds to a play that ends in a touchdown.

A super graphical tile may be selected to reveal additional graphical tiles in graphical tile list 405. For example, super graphical tile 1040 may be a link to one or more graphical tiles (including super graphical tiles or nested graphical tiles) that correspond to play events that were recently generated or received. In response to receiving input that a user selected super graphical tile 1040, the linked graphical tiles may be displayed in graphical tile list 405. Also for example, super graphical tile 1050 may be a link to one or more graphical tiles (including super graphical tiles or nested graphical tiles) that correspond to play events that are deemed to be highlights, or "big" plays or drives. In response to receiving input that a user selected super graphical tile 1050, the linked graphical tiles may be displayed in graphical tile list 405.

Graphical tiles may be displayed in different visual formats and with different data. For example, graphical tiles 910, 920, 930, 940, 950, 1010, 1020, 1030, 1040, and 1050 each include different data in various visual formats. Graphical tile 910 includes indicator 912, which describes which team possesses the ball during the corresponding drive. Also for example, graphical tile 920 includes an image from, and a link (link 926) to, a video clip, referenced by the play event that corresponds to graphical tile 920. In contrast, graphical tiles 930, 940, 950, 1010, 1020, 1030, 1040, and 1050 do not include an image or a link to play a video. In another example, graphical tile 920 includes a longer description than graphical tiles 930, 940, or 950.

Links may be visually different based on the team associated with the play event corresponding to the linked graphical tile. For example, link 1026 may be a different color than link 1028. Accordingly, link 1026 may link to a graphical tile that is associated with a first team, and link 1028 may link to a graphical tile that is associated with a second team.

In FIG. 4E and FIG. 4F, the two most recent drives are illustrated in super tile 910 and super tile 990, and previous drives are grouped into other super tiles which summarize one or more portions of the game: super graphical tile 1010, super graphical tile 1020, super graphical tile 1030, super graphical tile 1040, and super graphical tile 1050. Some super graphical tiles, which summarize one or more portions or plays of the game, may group together graphical tiles representing plays or drives based on game clock time. For example, super graphical tile 1010, which corresponds to the third quarter of a game, includes links (link 1016 and link 1018) to two super graphical tiles representing two drives that took place during the third quarter. Some super graphical tiles, which summarize one or portions of the game, may group together graphical tiles representing plays or drives based on the type of play. For example, super graphical tile 1050 includes a link to at least two graphical tiles representing plays or drives which are designated as "highlights" of the game. A super graphical tile that summarizes one or more portions or plays of a game may include and/or link to graphical tiles already listed in graphical tile list 405.

Graphical tiles may be included in graphical tile list before or after super graphical tiles that summarize one or portions of the game. For example, the most recent graphical tiles may be included first in graphical tile list 405, followed by one or more super graphical tiles that summarize one or portions of the game. Additional graphical tiles may be included in graphical tile list 405 below super graphical tile 1050, which summarizes one or more portions of the game. The most recent graphical tiles may be a particular number of the most recently generated graphical tiles (for example, the last two generated graphical tiles). Additionally or alternatively, the most recent graphical tiles may be the graphical tiles that represent plays or drives that took place in the game within a particular amount of time (for example, the current quarter or the last ten minutes).

5.3 Play Event Icons

In FIG. 4A, FIG. 4B, FIG. 4C, and FIG. 4D, bar 450 includes play event icons 460, 462, 464, 466, and 468. Each of play event icons 460, 462, 464, 466, and 468 may be associated with, or may correspond to, a play event. Furthermore, each of play event icons 460, 462, 464, 466, and 468 may be associated with, or may correspond to, a graphical tile in graphical tile list 405. For the purpose of illustrating a clear example, assume play event icon 462 corresponds to the same play event as graphical tile 416. Accordingly, play event icon 462 may be associated with graphical tile 416. Similarly, play event icon 464 may correspond to the same play event as graphical tile 418. Accordingly, play event icon 464 with graphical tile 418.

Play event icons may be color coded based, at least in part, on the corresponding play event. For example, play event icon 462 may be shaded differently than play event icon 464. Furthermore, for the purpose of illustrating a clear example, assume that the play event that corresponds to play event icon 462 is associated with a first team. Accordingly, play event icon 462 may be displayed with a first color. Further assume that the play event that corresponds to play event icon 464 is associated with a second team. Accordingly, play event icon 464 may be displayed with a second, different color. The color(s) assigned to a play event icon may be designated in the play event icon's corresponding play event, or the team color(s) of the team associated with the corresponding play event.

Additionally or alternatively, a play event icon may visually correspond with the corresponding graphical tile. For example, play event icon 462 has cross-hatching similar to graphical tile 416. Likewise, play event icon 464 does not have cross-hatching since graphical tile 418 also does not have cross-hatching.

Play event icons may be visually different based, at least in part, on the types of plays the corresponding play event is associated with. For example, a play event icon may include an icon with an upright stand to indicate that the corresponding play event is associated with a field goal or extra point. A play event icon may include an icon with arms extended upright to indicate that the corresponding play event is associated with a score, such as a touchdown. A play event icon may include an icon with arms crossed to indicate that the corresponding play event is associated with a personal foul. Additionally or alternatively, a play event icon may include an image, such as a logo, for the team associated with the corresponding play event.

The position of each play event icon in the bar may be based, at least in part, on the location of the corresponding graphical tile in the graphical tile list 405. For example, in FIG. 4B, expanded frame 454 covers play event icons 462 and 464 because corresponding graphical tiles 416 and 418 are currently in view within graphical tile list 405. Similarly, in FIG. 4D, expanded indicator 458 underscores play event icons 462 and 464 because corresponding graphical tiles 416 and 418 are currently in view within graphical tile list 405.

The position of each play event icon in the bar may be based, at least in part, on the starting and/or ending game clock time of the corresponding play event. For purposes of illustrating a clear example, assume that each quarter in a game is fourteen minutes long. As illustrated in graphical tile 418, the game clock starting time is approximately half way through the second quarter. Accordingly, play event icon 464, which corresponds with the same play event that graphical tile 418 corresponds to, is located approximately half the distance between markers 472 and 473, since markers 472 and 473 indicate the beginning of the second quarter and the third quarter, respectively.

A play event icon need not be displayed for all graphical tiles. For example, no play event icon precedes play event icon 464 during the second quarter, but a graphical tile is depicted in FIG. 4B that corresponds to a play event that starts with eight minutes and fifteen seconds left in the second quarter according to the game clock as illustrated in the graphical tile.

A play event icon may be displayed based, at least in part, on the corresponding play event indicating that the play event is marked as, or determined to be, important. For example, a play event may be determined to be important if any of the following are indicated in the play event: a different team has possession of the ball at the end of the play, a team scores, and/or a team has progressed the position of the ball a particular distance. Also for example, a play event may be determined to be important if an "important" field is selected. The "important" field may be selected automatically by an application or device distributing play events or by application 400. Additionally or alternatively, the "important" field may be selected manually by an operator or user, either before or after application 400 receives the play event.

5.4 Markers

In FIG. 4A, FIG. 4B, FIG. 4C, and FIG. 4D, bar 450 includes markers 471, 472, and 473. Markers may indicate particular milestones within a game, such as the beginning of a quarter, period, or overtime. For example, marker 471 marks the beginning of the first quarter of a game. Accordingly, marker 471 is labeled "Q1". Similarly, markers 472 and 473 indicate the beginning of the second quarter and the third quarter, respectively. Markers may also mark particular penalties or other milestones or times within a game. Markers need not be associated with any play event. Additionally or alternatively, markers may be associated with a time or timestamp corresponding to a game clock or other time. Additionally or alternatively, application 400 may display markers within a graphical tile list, such as graphical tile list 405.

The position of the markers in the bar may be based, at least in part, on the play event icons displayed in the bar. For example, marker 472, which indicates the beginning of the second quarter, precedes play event icons 462 and 464 in bar 450, because the play events corresponding to play event icons 462 and 464 take place during the second quarter as indicated in corresponding graphical tiles 416 and 418. Accordingly, marker 473 follows play event icons 462 and 464, since the position of marker 473 indicates the beginning of the third quarter.

The position of the markers in the bar may be based, at least in part, on the game clock or other time. For purposes of illustrating a clear example, assume that the length of the first quarter is the same as the length of the second quarter, at least according to the game clock. Accordingly, marker 471 may be the same distance from marker 472, as marker 472 is from marker 473.

5.5 Frames and Indicators

Frames and indicators may be used to visually indicate which graphical tiles are being displayed. For example, FIG. 4A and FIG. 4B illustrate a linearly movable and expandable frame, FIG. 4A illustrates collapsed frame 452 and FIG. 4B illustrates expanded frame 454. In the embodiment illustrated in FIG. 4A, displaying collapsed frame 452 nearest to the text, "LIVE", indicates that one or more of the present or most current play events, which have been received by application 400, are currently displayed as graphical tiles in graphical tile list 405. In the embodiment illustrated in FIG. 4B, expanded frame 454, which covers play event icons 462 and 464, indicates that corresponding graphical tiles 416 and 418 are currently visible in graphical tile list 405.

Additionally or alternatively, the frame, or a portion of the frame, may be selectable and may be used to scroll through graphical tiles. For example, in FIG. 4A and FIG. 4B, collapsed frame 452 and expanded frame 454 may be selected by a user. According to user input, the collapsed frame 452 and/or expanded frame 454 may move along bar 450. Furthermore, the graphical tiles that correspond with the play event icons covered by either collapsed frame 452 or expanded frame 454 may be visible in graphical tile list 405.

Additionally or alternatively, the graphical tiles listed in graphical tile list 405 may be scrolled through. Accordingly, an indicator in bar 450 may be updated to visually indicate which graphical tiles are currently displayed. For example, FIG. 4C and FIG. 4D illustrate a linearly movable and expandable indicator. FIG. 4C illustrates collapsed indicator 456. FIG. 4D illustrates expanded indicator 458. In the embodiment illustrated in FIG. 4C, displaying collapsed indicator 456 nearest to the text, "LIVE", indicates that one or more of the present or most current play events, which have been received by application 400, are currently displayed as graphical tiles in graphical tile list 405. In the embodiment illustrated in FIG. 4D, expanded indicator 458, which underscores play event icons 462 and 464, indicates that corresponding graphical tiles 416 and 418 are currently visible in graphical tile list 405.

Additionally or alternatively, a marker or scrubber may be used to indicate which graphical tiles may be visible in graphical tile list 405.

5.6 Drive Chart

Figure 5:
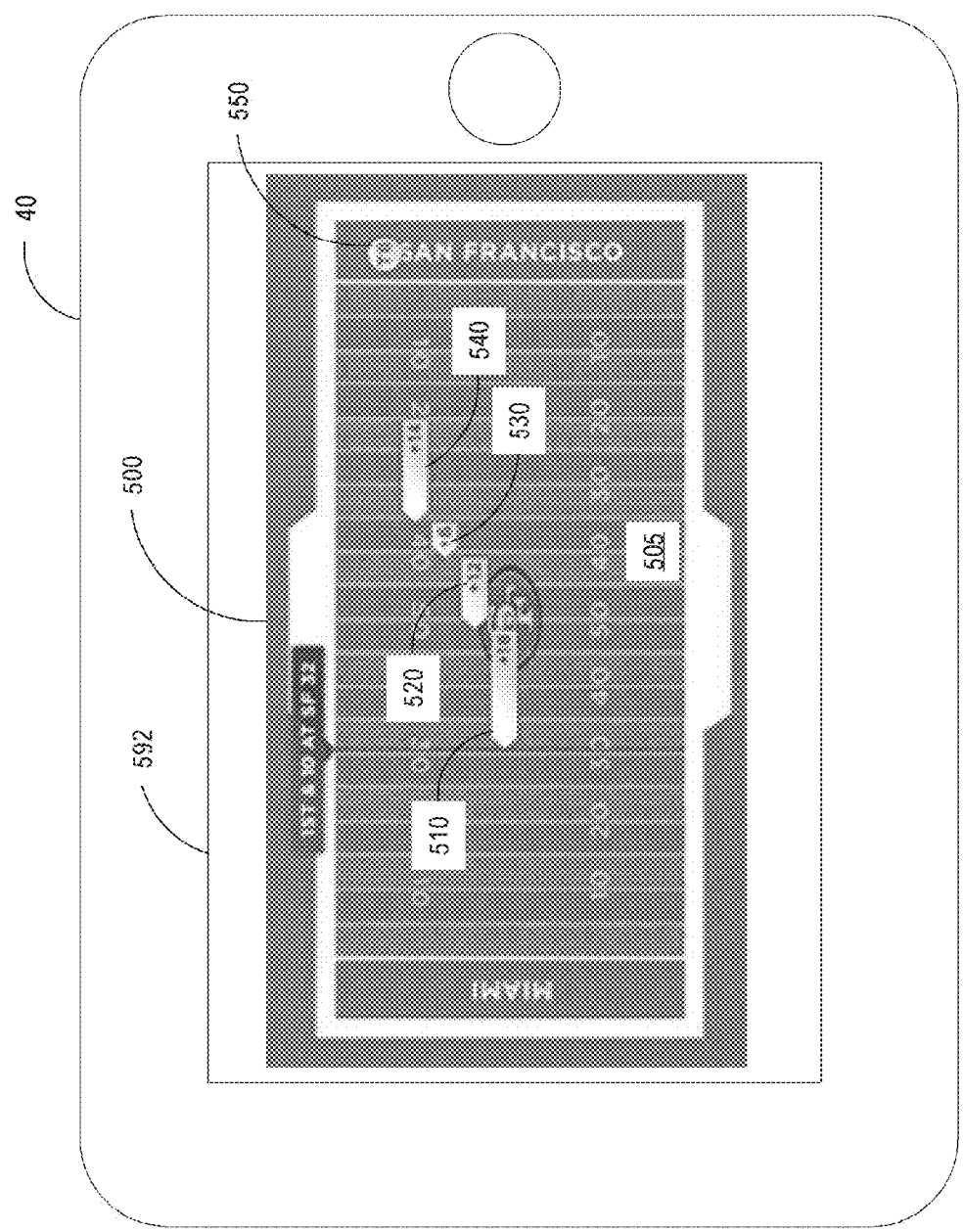
FIG. 5 is a block diagram illustrating a drive chart on an example mobile device 40 of FIG. 1A, in an example embodiment.

FIG. 5 is a block diagram illustrating a drive chart on an example mobile device 40 of FIG. 1A, in an example embodiment. Example mobile device 40 includes touch screen display 592 on which graphical representation 500 of the live sporting event is displayed. In this example, the live sporting event is a professional American football. However, a graphical representation of other live sporting events may be displayed in other embodiments. For example, the graphical representation may be of a soccer game, a basketball game, a baseball game, a hockey game, etc.

Graphical representation 500 includes a representation 505 of the playing area. In this example, playing area representation 505 is of a professional American football field showing the end zones, field boundaries, and yardage markings. A different playing area representation 505 may be displayed for other live sporting events. For example, the playing area representation may be of a soccer field, a basketball court, a baseball field, a hockey rink, etc.

Graphical representation 500 also includes recent play indicators 510 through 550. In this example, the five most recent plays are shown with recent play indicators 510 through 550, each indicator indicating the yardage gained, or lost, by the team currently in possession of the football. In particular, the most recent play is illustrated by play indicator 510 is a gain of 18 yards. The second most recent play, illustrated by play indicator 520, is a gain of twelve yards. The third most recent play, illustrated by play indicator 530, is a gain of six years. The fourth most recent play, illustrated by play indicator 540, is a gain of fourteen yards. And, the fifth most recent play, illustrated by play indicator 550, is a touchback.

In the current example, each of the recent play indicators 510-550 indicates a number of aspects of the corresponding play. In one aspect, each of the recent play indicators 510-550 indicates the location(s) of the play relative to the playing field illustrated in playing area representation 505. For example, recent play indicator 540 indicates that the corresponding play started at the twenty yard line and that the football was advanced to the thirty-four yard line. In another aspect, each of the recent play indicators 510-550 indicates the direction the corresponding play is moving relative to the playing field. For example, recent play indicator 510 indicates that during the corresponding play San Francisco advanced the football toward the Miami end zone. In yet another aspect, each of the recent play indicators 510-550 indicates the amount of the playing field covered by the corresponding play. For example, recent play indicator 530 indicates that the corresponding play covered six yards. Recent play indicators may indicate other play information. For example, recent play indicators may indicate player information (e.g., player name(s) and/or player number(s) involved in the play), timing information (e.g., game time occurrence of the play and/or play time length), touch backs, or scoring plays. Recent play indicators can indicate different play aspects for different types of live sporting events. For example, recent play indicators for a soccer game, basketball, game, or hockey game may indicate that a shot attempt was made, where on the playing field the shot was taken, which player took the shot, and the result of the shot attempt.

Additionally, each of the recent play indicators 510-550 may be a link corresponding to a play event. Accordingly, in response to a user selecting one of recent play indicators 510-550, the application may present the media included or referenced in the corresponding play event.

5.7 Application

Application 400 may also be an application running on a computing device such as one of the mobile devices 40 of FIG. 1A. For example, application 400 may be a mobile application running on a mobile device, such as a mobile phone or tablet. Application 400 may also be an application running on a desktop or laptop computer. A remote device performing an operation and/or task may mean the remote device executing one or more instructions defined in a specialized app, like the application 400, which causes the remote device to perform the operation and/or task.

Application 400 may be restricted, such that one or more features may be performed during select times and/or places. For example, application 400 may be configured to perform during a particular game, and may be configured to terminate performance of one or more features after the game has finished. Also for example, application 400 may be configured to perform one or more features while the device, which application 400 is running on, is within a particular distance from the location that the game is, or was, being played at, and to terminate performance of the one or more features otherwise.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
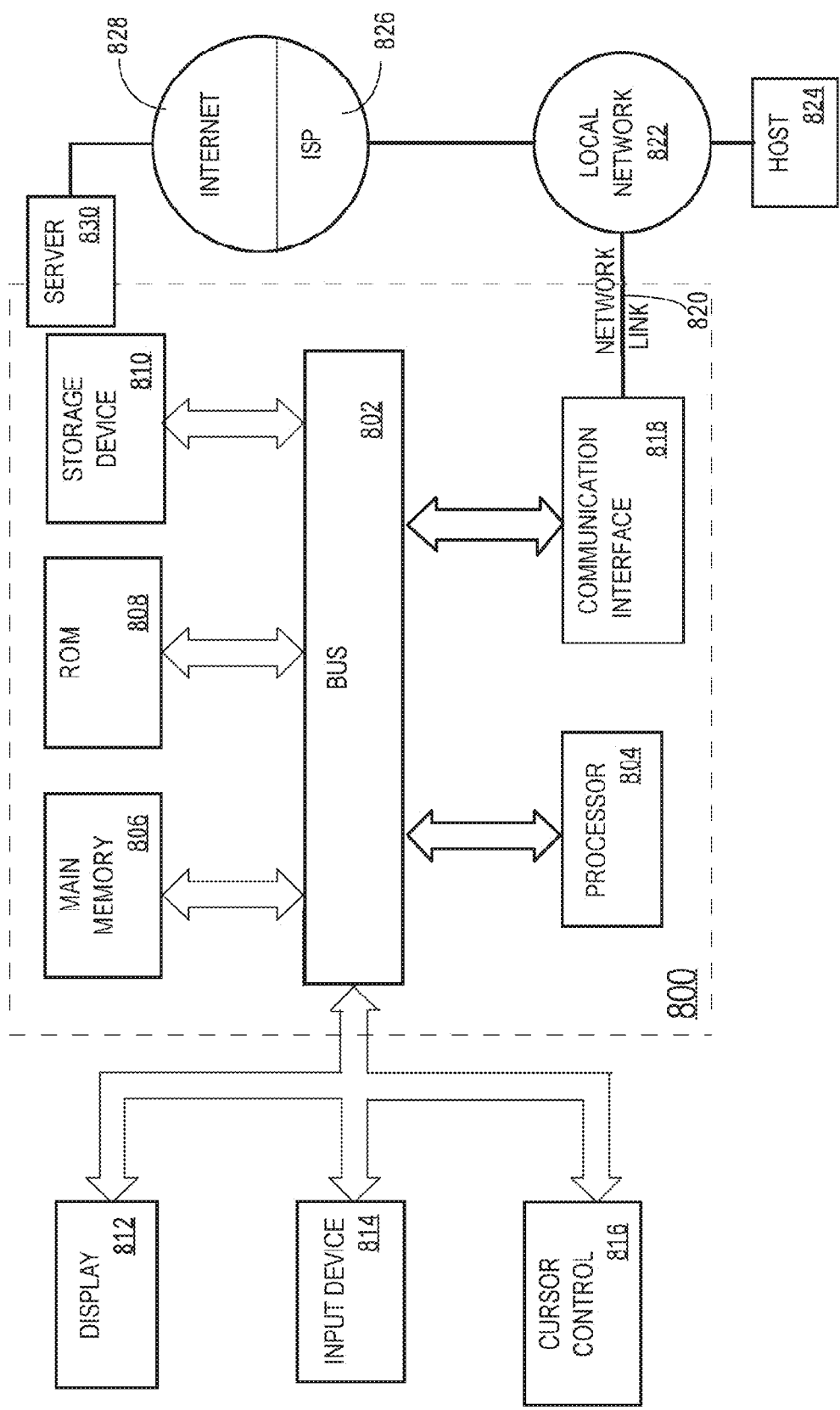
FIG. 8 illustrates a computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing system having improved processing logic configured to determine when one or more plays during a sporting event have finished and to update one or more mobile computing devices comprising:

a memory;

a processor coupled to the memory;

play event transceiver logic coupled to the memory and the processor and configured to electronically receive a first set of digital data associated with the sporting event, wherein the first set of digital data includes a set of current states in the sporting event, and the set of current states comprises a game clock state and a play clock state;

play event processing logic coupled to the memory and the processor and configured to determine the play clock state is set to a particular number of seconds, and in response, determine that a first play has ended, determine an ending time for the first play, and generate a first play event signal that includes the first ending time and indicating that the first play has ended, wherein the ending time is an ending index into multimedia content stored in non-volatile storage;

wherein the play event transceiver logic is further configured to send the first play event signal to the one or more mobile computing devices;

a data storage device configured to store mobile device app logic comprising one or more sequences of instructions which when downloaded to and executed using the one or more mobile computing devices causes each of the one or more mobile computing devices, in response to receiving the first play event signal, to display a first graphical tile in a graphical tile list in a graphical user interface on a display coupled to that mobile computing device, and to display a plurality of markers in the graphical user interface that identify a beginning of a quarter, a beginning of a period, and a beginning of an overtime.

2. The system of claim 1, wherein the play event processing logic is configured to:

determine a starting time for the first play, wherein the starting time is a beginning index into the multimedia content stored in non-volatile storage;

include the starting time in the first play event signal;

wherein the mobile device app logic is further configured to cause the mobile computing device, in response to a user selecting the first graphical tile, and based on the first play event signal, to request a segment of the multimedia content, starting from the beginning index into the multimedia content through the ending index into the multimedia content from the non-volatile storage.

3. The system of claim 1, wherein the play event processing logic is configured to:

determine a drive identifier and include the drive identifier in the first play event signal, wherein the drive identifier uniquely identifies an offensive drive of a team engaged in an American football game;

determine a second play has started and receive a second set of data associated with the sporting event;

determine the second play has ended from the second set of data, and in response, generate a second play event signal, which includes the drive identifier;

send the second play event signal to the one or more mobile computing devices;

wherein the mobile device app logic is further configured to cause each mobile computing device, in response to receiving the second play event signal, to determine that the first play event signal and the second play event signal correspond to plays that are both in the drive based on the drive identifier in the first play event signal and the second play event signal, and in response, present a second graphical tile in the graphical tile list in the graphical user interface on the display coupled to the mobile computing device and visually indicate in the graphical user interface that the first graphical tile and the second graphical tile are both part of the drive.

4. The system of claim 3, wherein the play event processing logic is configured to:

determine the drive has ended from the second set of data;

include data in the second play event signal indicating that the second play ended the drive;

wherein the mobile device app logic is further configured to cause each mobile computing device, in response to receiving one or more inputs from a user, present content to the user indicating progression of the team over a plurality of plays in the drive.

5. The system of claim 4, wherein the content is multimedia content from each play in the drive stitched together in a single multimedia content package.

6. The system of claim 4, wherein the content is a drive chart that indicates progression of the team after each play in the drive.

7. The system of claim 4, wherein the play event processing logic is configured to determine that the drive is ended based on data indicating that a first team had possession of a ball in the first play, a second team now has possession of the ball and the first team does not have possession of the ball.

8. The system of claim 4, wherein the play event processing logic is configured to determine that the drive is ended based on data in the second set of data indicating a score has changed.

9. The system of claim 4, wherein the play event processing logic is configured to determine that the drive is ended based on data in the second set of data indicating a period has ended.

10. A data processing method comprising:

receiving data associated with a sporting event from one or more sources, wherein the data includes a set of current states in the sporting event, and the set of current states comprises a game clock state and a play clock state;

determining the play clock state is set to a particular number of seconds, and in response, determining that a first play has ended based on the data received from the one or more sources, determining that the first play has ended, determining an ending time for the first play, and generating a first play event signal that includes the first ending time, wherein the ending time is an ending index into multimedia content stored in non-volatile storage;

sending the first play event signal to a mobile computing device;

causing displaying a first graphical tile in a graphical tile list in a graphical user interface of the mobile computing device;

causing displaying a plurality of markers in the graphical user interface that identify a beginning of a quarter, a beginning of a period, and a beginning of an overtime;

wherein the method is performed by one or more computing devices.

11. The method of claim 10 comprising:

determining a starting time for the first play, wherein the starting time is a beginning index into the multimedia content stored in non-volatile storage;

including the starting time and the ending time in the first play event signal, and causing the mobile computing device, in response to a user selecting the first graphical tile and based on the first play event signal, to request a segment of the multimedia content, starting from the beginning index into the multimedia content through the ending index into the multimedia content from the non-volatile storage.

12. The method of claim 11 comprising:

determining a drive identifier, wherein the drive identifier uniquely identifies an offensive drive of a team engaged in an American football game;

including the drive identifier in the first play event signal;

determining a second play has started;

receiving a second set of data associated with the sporting event;

determining the second play has ended from the second set of data, and in response, generating a second play event signal, which includes the drive identifier;

sending the second play event signal to the mobile computing device;

causing the mobile computing device to determine that the first play event signal and the second play event signal correspond to plays that are both in the drive based on the drive identifier in the first play event signal and the second play event signal, and in response, present a second graphical tile in the graphical tile list in the graphical user interface on the display coupled to the mobile computing device and visually indicate in the graphical user interface that the first graphical tile and the second graphical tile are both part of the drive.

13. The method of claim 12 comprising:

determining the drive has ended from the second set of data;

including data in the second play event signal indicating that the second play ended the drive;

causing the mobile computing device, in response to one or more inputs from a user, to present content to the user indicating progression of a team over a plurality of plays in the drive.

14. The method of claim 13, wherein the content is multimedia content from each play in the drive stitched together as if a single multimedia content package.

15. The method of claim 13, wherein the content is a drive chart that indicates progression of a team after each play in the drive.

16. The method of claim 13, wherein a first team had possession of a ball in the first play, the method comprising determining that the drive is ended based on data in the second set of data indicating that a second team now has possession of the ball and the first team does not have possession of the ball.

17. The method of claim 13 comprising determining that the drive is ended based on data in the second set of data indicating a score has changed.

18. The method of claim 13 comprising determining that the drive is ended based on data in the second set of data indicating a period has ended.

* * * * *